(12) United States Patent
Morita

(10) Patent No.: US 12,206,275 B2
(45) Date of Patent: Jan. 21, 2025

(54) REDUNDANT POWER SOURCE SYSTEM WITH OVERVOLTAGE RESPONSE

(71) Applicant: DENSO CORPORATION, Kariya (JP)

(72) Inventor: Tetsuo Morita, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/206,719

(22) Filed: Jun. 7, 2023

(65) Prior Publication Data

US 2023/0318345 A1 Oct. 5, 2023

Related U.S. Application Data

(63) Continuation of application No. PCT/JP2021/044287, filed on Dec. 2, 2021.

(30) Foreign Application Priority Data

Dec. 14, 2020 (JP) ................................ 2020-206746

(51) Int. Cl.
*H02J 7/00* (2006.01)
*B60L 50/51* (2019.01)

(52) U.S. Cl.
CPC ........ *H02J 7/007182* (2020.01); *B60L 50/51* (2019.02); *H02J 7/00714* (2020.01); *B60L 2240/547* (2013.01); *B60L 2240/549* (2013.01)

(58) Field of Classification Search
CPC ............... H02J 7/007182; B60L 50/51; B60L 2240/547; B60L 2240/549

USPC .................................................. 307/10.1, 42
See application file for complete search history.

(56) References Cited

U.S. PATENT DOCUMENTS

| 2018/0172770 | A1* | 6/2018 | Sun .................. B60L 58/10 |
| 2020/0216002 | A1 | 7/2020 | Mazaki et al. |
| 2021/0242712 | A1* | 8/2021 | Izawa .................. B60R 16/033 |
| 2023/0072786 | A1 | 3/2023 | Morita |

FOREIGN PATENT DOCUMENTS

JP 2021-184690 A 12/2021

* cited by examiner

*Primary Examiner* — Michael R. Fin
(74) *Attorney, Agent, or Firm* — Oliff PLC

(57) ABSTRACT

A power source system has a first system having a first power supply path and a first power source supplying a power source voltage, a second system having a second power supply path and a second power source having a battery being charged by the power source voltage, an intersystem switch, a switching controller switching the intersystem switch between an open state and a closed state, and a charging discharging part, arranged between the second power source and a connection node of a connection path on the second power supply path. The charging discharging part performs charging of the battery by the power source voltage and discharging of the battery based on a discharging request after completion of battery charging, and performs charging of the battery before the switching controller switches the intersystem switch to the open state from the closed state when overvoltage occurs in any system under the closed state of the intersystem switch.

13 Claims, 12 Drawing Sheets

REDUNDANT POWER SOURCE SYSTEM WITH OVERVOLTAGE RESPONSE

CROSS-REFERENCE TO RELATED APPLICATION

This application is the U.S. bypass application of International Application No. PCT/JP2021/044287 filed on Dec. 2, 2021, which designated the U.S. and claims priority to Japanese Patent Application No. 2020-206746 filed on Dec. 14, 2020, the contents of both of which are incorporated herein by reference.

TECHNICAL FIELD

The present disclosure relates to power source systems.

BACKGROUND

For example, power source systems have recently been known, to be applied to vehicles, which supply electric power to various devices in vehicles. The power source system has a power supply system for supplying electric power to various electric loads, such as an electric braking device, or an electric power steering device, necessary for driving the vehicle. When the power supply function of the power supply system stops due to occurrence of abnormality during traveling of the vehicle, the power source system cannot continue vehicle traveling. In order to avoid power supply loss and to maintain the power supply function even when abnormality occurs in the power source system during the vehicle traveling, there are known devices having a first power source and a second power source for suppling electric power to the electric loads of the vehicle.

SUMMARY

A first aspect of the present disclosure provides a power source system having a first system, a second system, an intersystem switch. The first system supplies electric power of a first power source to an electric load through a first power supply path. The second system supplies electric power of a second power source to the electric load through a second power supply path. The intersystem switch is arranged on a connection path through which the first power supply path and the second power supply path are connected. The first power source supplies a power source voltage to the electric load to drive the electric load. The second power source has a battery to be charged by the power source voltage of the first power source. The power source system further has a switching controller and a charging discharging part. The switching controller switches between an open state and a closed state of the intersystem switch. The charging discharging part is arranged between the second power source and a connection node. The connection node is arranged between the second power supply path and the connection path. The charging discharging part supplies the power source voltage to the battery to be charged, and performs discharging of the battery after completion of charging of the battery in response to a discharging request. The charging discharging part is configured to start to charge the battery before the switching controller switches the intersystem switch to the open state from the closed state when overvoltage occurs in any one of the first system and the second system under the closed state of the intersystem switch.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

Figure 1:
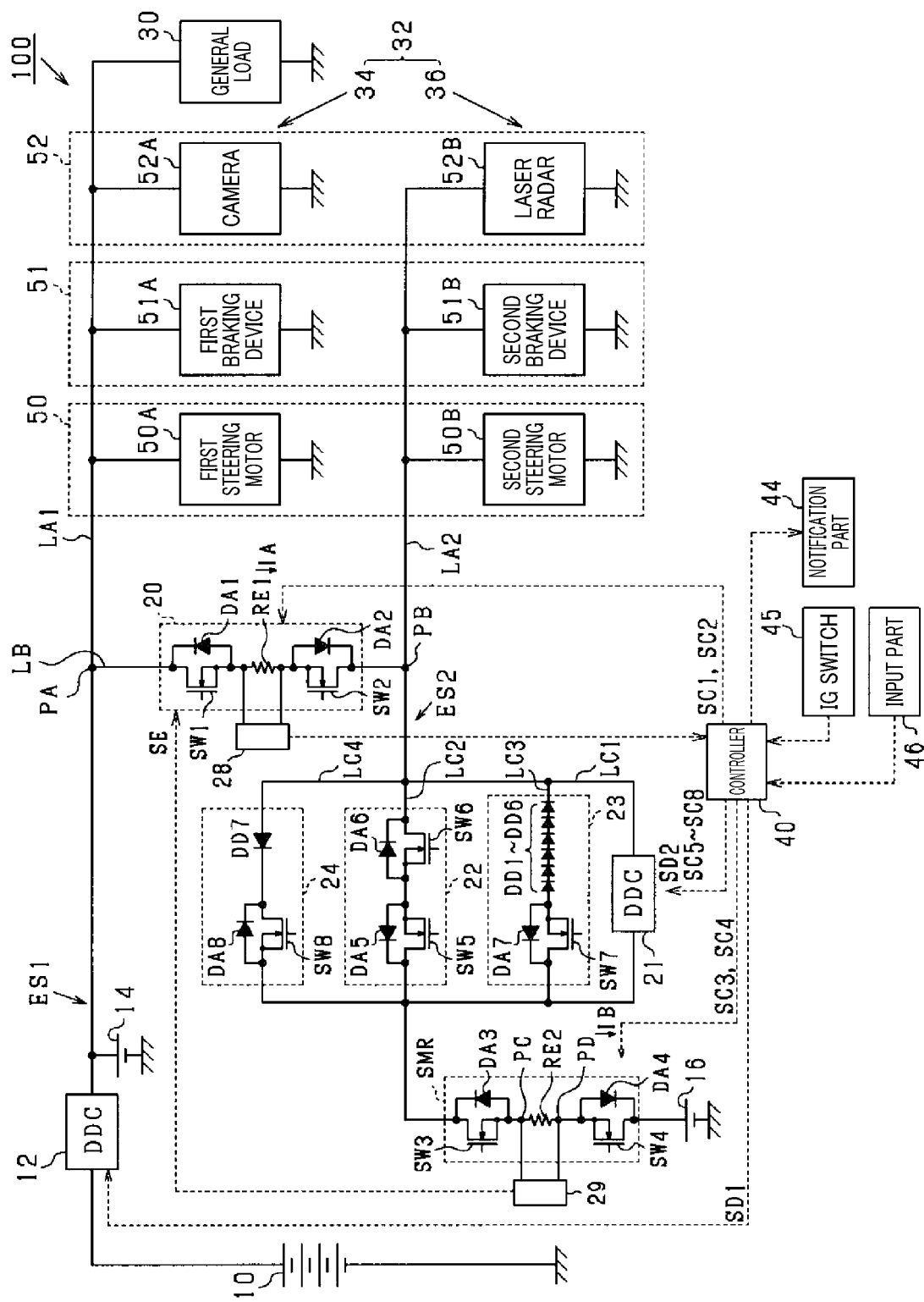
FIG. 1 is a view showing an overall structure of a power source system according to a first embodiment.

For example, there is a known power source system to be applied to such devices, disclosed in JP 2019-62727 A applied to the devices previously described. The power source system has a first load, a second load, a first system having a first power source connected to the first load, and a second system having a second power source connected to the second load. The power source system has a controller and an intersystem switch arranged on a connection path through which the first system and the second system are connected to each other. The controller turns off the intersystem switch when detecting an abnormality in the first system or the second system. This control allows the electric loads in other system where no abnormality occurs to provide the necessary function to continue safe driving of the vehicle.

In the power source system previously described, the controller switches the intersystem switch to the open state when overvoltage occurs in any one of the first system and the second system under a situation in which the intersystem switch is in the closed state. However, there might be a risk of abnormality occurring due to the overvoltage when an excessive voltage is supplied to the electric loads in the systems until the controller switches the intersystem switch to the open state.

The present invention has been made in consideration of the foregoing circumstances, and it is an object of the present invention to provide a power source system that allows electric loads to correctly work even when overvoltage occurs.

A first aspect of the present disclosure provides a power source system having a first system, a second system, an intersystem switch. The first system supplies electric power of a first power source to an electric load through a first power supply path. The second system supplies electric power of a second power source to the electric load through a second power supply path. The intersystem switch is arranged on a connection path through which the first power supply path and the second power supply path are connected. The first power source supplies a power source voltage to the electric load to drive the electric load. The second power source has a battery to be charged by the power source voltage of the first power source. The power source system further has a switching controller and a charging discharging part. The switching controller switches between an open state and a closed state of the intersystem switch. The charging discharging part is arranged between the second power source and a connection node. The connection node is arranged between the second power supply path and the connection path. The charging discharging part supplies the power source voltage to the battery to be charged, and performs discharging of the battery after completion of charging of the battery in response to a discharging request. The charging discharging part is configured to start to charge the battery before the switching controller switches the intersystem switch to the open state from the closed state when overvoltage occurs in any one of the first system and the second system under the closed state of the intersystem switch.

According to the structure previously described, the power supply system has the first system and the second system. The first system supplies electric power of the first power source to the electric load through the first power supply path. The second system supplies electric power of the second power source to the electric load through the second power supply path. This structure allows the electric load to receive electric power supplied from any one of the first power source and the second power source. The intersystem switch is further arranged in the power source system to connect the first power supply path and the second power supply path. Accordingly, the switching of the intersystem switch to the closed state allows the battery in the second power source to be charged by the electric power voltage supplied from the first power source, and allows the battery in the second power source to discharge in response to the discharging request. Further, even when a power source failure occurs, i.e., ground fault or wire break occurs, the power source system supplies electric power of the other power source system, where no malfunction of the power source has occurred, to the electric load by switching the intersystem switch to the open state. This allows the electric load to continue correct operation.

When the overvoltage occurs in any one of the first system and the second system under the closed state of the intersystem switch, the switching controller switches the intersystem switch to the open state. However, there might be a risk of malfunction occurring due to overvoltage when an excessive voltage is applied to the electric load in each of the first system and the second system until when the intersystem switch is switched to the open state.

In the structure previously described, the charging of the battery is started before the intersystem switch is switched to the open state when overvoltage occurs in any system. This structure makes it possible for the battery to receive the overvoltage, to suppress the electric load in each system from receiving any excessively high voltage, and for the electric load to operate correctly when the overvoltage occurs.

A second aspect of the present disclosure provides the power source system in which the charging discharging part has a prohibition part and a connection part. The prohibition part prohibits the battery from charging and discharging under the closed state of the intersystem switch after completion of charging of the battery. The connection part connects the connection node and the second power source during a prohibition period of the prohibition part prohibiting the battery from charging and discharging before the switching controller switches the intersystem switch to the open state from the closed state when overvoltage occurs during the prohibition period of the prohibition part.

The structure of the present aspect previously described prohibits the battery from charging and discharging after completion of the charging of the battery. This structure makes it possible to maintain the voltage of the battery at a desired voltage due to the power source voltage when the battery in the second power source supplies electric power in response to the discharging request. It is in general difficult for the battery to receive overvoltage when the overvoltage occurs in the prohibition period of the charging and discharging of the battery.

On the other hand, in the structure of the present aspect previously described, because the connection node is connected to the second power source during the prohibition period for prohibiting the battery from charging and discharging before the intersystem switch is switched to the open state when overvoltage occurs in any one of the systems during the prohibition period, it is possible for the battery to receive overvoltage during the prohibition period.

A third aspect of the present disclosure provides the power source system having a first path and a second path arranged in parallel between the second power source and the connection node on the second power supply path at the connection path. The prohibition part is arranged on the first path. The connection part is arranged on the second path.

The present aspect previously described provides the structure in which the first path and the second path are arranged in parallel between the second power source and the connection node at the connection path in the second system. This structure prohibits the battery from charging and discharging during a period in response to the discharging request after completion of charging of the battery. It is in general difficult for the battery to receive overvoltage through the first path when overvoltage occurs during the prohibition period in which the charging and discharging of the battery is prohibited.

On the other hand, the present aspect of the disclosure previously described has the structure in which the first path and the second path are arranged in parallel. This structure makes it possible to connect the connection node to the second power source through the second path when overvoltage occurs during the prohibition period through the first path. Although it is difficult for the battery to receive overvoltage through the first path during the prohibition period, the structure of the present aspect makes it possible for the battery to receive overvoltage through the second path during the prohibition period.

A fourth aspect of the present disclosure provides the power source system having the structure in which the connection part has a power supply control circuit. The power supply control circuit prohibits the connection node from supplying electric power to the battery in response to a voltage at the connection node being less than a predetermined upper limit value of the voltage at the connection node. The power supply control circuit allows the connection node to supply electric power to the battery in response to the voltage at the connection node being greater than the predetermined upper limit value.

The structure of the present aspect previously described provides the power supply control circuit arranged in the second path so as to control the power supply through the connection node. The power supply control circuit prohibits the battery from receiving the electric power through the connection node in response to the voltage at the connection node being less than the predetermined upper limit value. The power supply control circuit allows the connection node to supply electric power to the battery in response to the voltage at the connection node being greater than the predetermined upper limit. This structure makes it possible for the power supply control circuit to withdraw the prohibition and to allow the battery to receive the overvoltage through the second path when the voltage at the connection node becomes greater than the predetermined upper limit value due to the occurrence of overvoltage in any system. In addition, because the power supply control circuit is composed of a hardware arranged in the second path, this structure makes it possible for the battery to quickly receive the generated overvoltage when the voltage at the connection node becomes greater than the predetermined upper limit value.

A fifth aspect of the present disclosure provides the power source system having the structure in which the power supply control circuit prohibits the connection node from supplying electric power to the battery in response to a voltage difference between the voltage at the connection node being less than a predetermined threshold voltage of the connection node assuming that the voltage at the connection node is less than the predetermined upper limit. The power supply control circuit allows the connection node to supply electric power to the battery in response to the voltage difference between the voltage at the connection node being greater than the predetermined threshold voltage, i.e., as the voltage at the connection node is greater than the predetermined upper limit value.

The structure previously described detects the increasing of the voltage at the connection node based on a voltage difference between the voltage at the connection node and the voltage of the battery. This structure makes it possible to correctly detect whether the voltage at the connection node becomes greater than the voltage of the battery as a reference voltage.

A sixth aspect of the present disclosure provides the structure in which the power supply control circuit has a diode arranged in a direction to prohibit the battery from supplying electric power to the connection node on the second path.

This structure of the present aspect previously described has the diode as the power supply control circuit to prohibit the battery from supplying electric power to the connection node based on the rectifier function of the diode. Further, this structure makes it possible to prohibit the connection node from supplying electric power to the battery by the forward voltage of the diode in response to the voltage difference between the voltage at the connection node and the voltage of the battery being less than the predetermined threshold voltage. When overvoltage occurs, this structure allows a current to flow from the connection node to the battery and allows the battery to receive overvoltage through the second path when the voltage difference previously described becomes more than the forward voltage of the diode.

A seventh aspect of the present disclosure provides the structure in which the power supply control circuit has a Zener diode arranged in a direction to prohibit the connection node from supplying electric power to the battery in the second path.

This structure of the present aspect previously described has the Zener diode as the power supply control circuit to prohibit the connection node from supplying electric power to the battery based on the rectifier function of the Zener diode in response to the voltage difference in voltage between the connection node and the battery being less than the predetermined threshold voltage. When the overvoltage occurs, this structure allows a current to flow from the connection node to the battery and allows the battery to receive the overvoltage through the second path when the voltage difference previously described becomes more than a breakdown voltage of the Zener diode.

An eighth aspect of the present disclosure provides the structure in which the charging discharging part has an in-system switch opening and closing the second power supply path. The switching controller switches the in-system switch between the closed state and open state. The switching controller switches the in-system switch to the open state from the closed state after completion of charging of the battery. The charging discharging part further has an in-system switching part that switches the in-system switch between the closed state and the open state, independently from the control of the switching controller. The in-system switching part switches the in-system switch to the closed state from the open state during an open control period of the in-system switch and before the in-system switch is switched to the open state from the closed state when overvoltage occurs during the open control period.

The structure of the present aspect previously described has the in-system switch arranged between the second power source and the connection node of the connection path in the second system. The switching controller switches the in-system switch to the open state after completion of the charging of the battery to prohibit the battery from charging and discharging. This structure makes it possible to maintain the battery at a desired voltage based on the power source voltage when the battery supplies the electric power in the second system in response to the discharging request. It is in general difficult for the battery to receive overvoltage occurring during the open control period of the in-system switch.

On the other hand, the present aspect of the disclosure previously described further has the in-system switching part in addition to the controller. The in-system switching part is configured to switch the in-system switch between the closed state and the open state, independently from the control of the switching controller. The in-system switching part switches the in-system switch to the closed state during the open control period of the in-system switch before the switching controller switches the intersystem switch to the open state on occurring overvoltage. This control makes it possible to connect the connection node and the second power source during the open control period, and possible for the battery to receive the overvoltage.

A ninth aspect of the present disclosure provides the structure in which the in-system switching part has a signal output circuit. The signal output circuit transmits a switching signal to the in-system switch. The switching signal switches the in-system switch to the open state from the closed state in response to the voltage at the connection node being less than the predetermined upper limit voltage of the connection node. The signal output circuit transmits the switching signal to the in-system switch, to switch the in-system switch from the open state to the closed state in response to the voltage at the connection node being greater than the predetermined upper limit voltage of the connection node.

This structure of the present aspect previously described has the signal output circuit providing the switching signal to switch the in-system switch between the open state and the closed state. The signal output circuit is configured to provide the switching signal to switch the in-system switch to the open state in response to the voltage at the connection node being less than the predetermined upper limit voltage of the connection node. The signal output circuit is further configured to provide the switching signal to switch the in-system switch to the closed state in response to the voltage at the connection node being greater than the predetermined upper limit voltage of the connection node. Accordingly, this structure makes it possible for the battery to receive the overvoltage through the in-system switch because the signal output circuit provides the switching signal to switch the in-system switch to the closed state when the overvoltage occurs in any system and the voltage at the connection node becomes greater than the predetermined upper limit voltage of the connection node. The signal output circuit is composed of a hardware to switch the in-system switch between the closed state and the open state, independently from the control of the switching controller. This structure makes it possible to quickly receive the generated overvoltage when the voltage at the connection node becomes greater than the predetermined upper limit voltage of the connection node.

A tenth aspect of the present disclosure provides the structure in which the signal output circuit transmits the switching signal to switch the in-system switch to the open state from the closed state in response to the voltage difference between the voltage at the connection node and the voltage of the battery being less than the predetermined threshold voltage. In this case, the signal output circuit assumes that the voltage at the connection node is less than the predetermined upper limit value. The signal output circuit transmits the switching signal to switch the in-system switch to the closed state from the open state in response to the voltage difference between the voltage at the connection node and the voltage of the battery being greater than the predetermined threshold voltage. In this case, the signal output circuit assumes that the voltage at the connection node is greater than the predetermined upper limit value.

The structure previously described detects increasing of the voltage at the connection node based on the voltage difference between the voltage at the connection node and the voltage of the battery. This structure allows the power source system to correctly detect whether the voltage at the connection node becomes greater than the voltage of the battery as a reference voltage.

An eleventh aspect of the present disclosure provides the structure in which the signal output circuit has a comparator having input terminals as a pair. One of the input terminals of the comparator is connected to one of input terminals as a pair in the in-system switch. The other input terminal of the comparator is connected to the other input terminal of the in-system switch. An output terminal of the comparator is connected to an open/close control terminal of the in-system switch.

The structure of the present aspect previously described has the comparator as the signal output circuit. One input terminal of the comparator is connected to one input terminal of the in-system switch, and the other input terminal of the comparator is connected to the other input terminal of the in-system switch. The output terminal of the comparator is connected to the open/close control terminal of the in-system switch. The open state of the in-system switch is maintained when overvoltage occurs and the voltage difference between the connection node and the battery is less than the predetermined threshold voltage under when the switching controller opens the interconnection switch. On the other hand, this structure makes it possible for the battery to receive the overvoltage through the in-system switch because the in-system switch is switched to the closed state in response to the voltage difference being greater than the predetermined threshold voltage due to the occurrence of the overvoltage.

A twelfth aspect of the present disclosure provides the structure in which the signal output circuit has a pair of bi-directional Zener diodes arranged in series with forward directions thereof being opposite to each other. One terminal of the bi-directional Zener diodes is connected to one of input terminals as a pair in the in-system switch. The other terminal of the bi-directional Zener diodes is connected to the open/close control terminal of the in-system switch.

The structure of the present aspect previously described has the bi-directional Zener diodes as the signal output circuit. One terminal of the bi-directional Zener diodes is connected to one of input terminals as a pair in the in-system switch. The other terminal of the bi-directional Zener diodes is connected to the open/close control terminal of the in-system switch. This structure makes it possible for the in-system switch is maintained in the open state due to the rectifier function of the bi-directional Zener diodes in response to the voltage difference between the connection node and the battery being less than the predetermined threshold voltage and no overvoltage occurs under the condition in which the switching controller switches the in-system switch to the open state. On the other hand, it is possible for the battery to receive the overvoltage because the in-system switch is switched to the closed state due to the rectifier malfunctioning of one Zener diode in response to the voltage difference being greater than the predetermined threshold voltage on occurring the overvoltage.

A thirteenth aspect of the present disclosure provides the intersystem switching part that switches the intersystem switch between the closed state and the open state, independently from the control of the switching controller. The intersystem switching part switches the intersystem switch to the open state from the closed state before the switching controller switches the intersystem switch to the open state from the closed state when a current flows between the connection node and the second power source, which is greater than the predetermined threshold current, when the charging of the battery starts after the occurrence of overvoltage.

The present disclosure previously described provides the structure in which the intersystem switch is operable independently from the control of the switching controller. This structure makes it possible to switch the connection switch to the open state before the switching controller switches the intersystem switch to the open state in response to a current being greater than the predetermined threshold current flows between the connection node and the second power source on starting the charging of the battery after overvoltage occurs in any system. This structure makes it possible to quickly switch the intersystem switch to the open state after the occurrence of overvoltage, and to suppress the phenomenon due to the occurrence of overvoltage in one system from being propagated to the other system. In this case, the switching operation of the intersystem switch is delayed from a time when the battery starts to receive the overvoltage. However, this structure previously described prohibits the electric loads in any system from receiving an excessive voltage because the battery starts to receive the overvoltage. This makes it possible to suppress the power source system from being influenced by the delay of the switching operation of the intersystem switch.

A fourteenth aspect of the present disclosure provides the structure in which the switching controller disconnects the connection node from the second power source in response to the voltage of the connection node being greater than the predetermined reference voltage even when the intersystem switching part switches the intersystem switch to the open state from the closed state.

When overvoltage occurs in the first system, no battery is overcharged because the battery charging is completed by switching the intersystem switch to the open state. On the other hand, when overvoltage occurs in the second system, because it is possible to continue the battery charging even when the intersystem switch is switched to the open state, there might be a risk of causing overcharging of the battery. That is, it is necessary to perform the correct operation of the battery in view of correct protection of the battery due to the occurrence of overvoltage in the first system and the second system.

The structure of the present disclosure previously described makes it possible to disconnect the second power source from the connection node in response to the voltage at the connection node being greater than the predetermined reference voltage even when the interconnection switch is switched to the open state. This structure makes it possible to correctly protect the battery from overvoltage occurred in the second system.

First Embodiment

Next, a description will be given of a power source system 100 as an in-vehicle power source system according to preferred embodiments of the disclosure with reference to figures.

As shown in FIG. 1, the power source system 100 supplies electric power to a general load 30 and specific loads 32. The power source system 100 has a high voltage battery 10, a converter 12 as a DC-DC converter, a first battery 14, a second battery 16, a switching part 20, a relay switch SMR (as a system main relay switch) and a controller 40.

The high voltage battery 10 is a lithium-ion battery, for example, for supplying a rated voltage (e.g., several hundred voltages V) which is greater than a voltage of the first battery 14 and the second battery 16. The converter 12 is a voltage generator which converts the electric power supplied from the high voltage battery 10 to a power source voltage VA, and supplies the converted power to the general load 30 and the specific loads 32. In the present embodiment, the general load 30 and the specific loads 32 are powered by the power source voltage VA.

The general load 30 represents electric loads that do not perform the driving control of a vehicle as a moving body. For example, the general load 30 corresponds to an air conditioning system, an audio system, a power window system, etc.

On the other hand, the specific loads 32 perform at least one of driving control functions. For example, the specific loads 32 correspond to an electric power steering device 50, an electric braking device 51 braking vehicle wheels, and a cruise control device 52. In the present embodiment, the specific loads 32 correspond to electric loads.

Accordingly, it is difficult to correctly perform driving control when a specific load 32 does not work correctly due to occurrence of abnormality in the specific load 32. To prevent the occurrence of abnormality from stopping the overall functions of the specific loads 32, the specific loads 32 have a first load 34 and a second load 36. Specifically, the electric power steering device 50 has a first steering motor 50A and a second steering motor 50B, and the electric braking device 51 has a first braking device 51A and a second braking device 51B. The cruise control device 52 has a camera 52A and a laser radar 52B. The first steering motor 50A, the first braking device 51A, and the camera 52A correspond to the first load 34. The second steering motor 50B, the second braking device 51B and the laser radar 52B correspond to the second load 36.

Although both the first load 34 and the second load 36 provide a single function, it is possible for each of the first load and the second load to provide a respective part of the function. For example, the first steering motor 50A and the second steering motor 50B in the electric power steering device 50 can steer the vehicle wheels, independently from each other. Each of the first steering motor 50A and the second steering motor 50B can drive the vehicle within a predetermined limitation of a steering speed and steering range.

Each of the specific loads 32 assists the driver to operate the manual transmission vehicles. Each of the specific loads 32 has the function for assisting the self-driving vehicles to automatically drive and stop. Accordingly, the specific loads 32 correspond to a load providing at least one of the functions to assist a cruise of the vehicle.

The first load 34 is connected to the converter 12 through the first power supply path LA1. The first battery 14 and the general load 30 are connected to the first power supply path LA1. For example, the first battery 14 is composed of a lead acid battery to be charged with a power source voltage VA of the converter 12. In the present embodiment, the first system ES1 is composed of the converter 12, the first battery 14, the general load 30 and the first load 34, which are connected to the first power supply path LA1. The high voltage battery 10 and the converter 12 correspond to the first power source.

The second load 36 is connected to the second battery 16 through the second power supply path LA2. The second battery 16 is composed of a lithium-ion battery, for example. In the present embodiment, the second system ES2 is composed of the second battery 16 and the second load 36, which are connected to the second power supply path LA2. The second battery 16 corresponds to the second power source and the battery.

The switching part 20 is arranged on a connection path LB through which the first system and the second system are connected. One terminal of the connection path LB is connected at a connection node PA to the first power supply path LA1. The other terminal of the connection path LB is connected at a connection node PB to the second power supply path LA2. In the switching part 20, a first switch SW1, a first resistance element RE1 and a second switch SW2 are connected in series in this order. In the structure of the switching part 20, the first switch SW1 is arranged closer to the first system ES1 side than the second switch SW2 is. In the present embodiment, the first switch SW1 and the second switch SW2 correspond to the intersystem switch.

The present embodiment shows N channel MOS FETs (hereinafter, MOSFET) as the first switch SW1 and the second switch SW2, respectively. Accordingly, the first switch SW1 and a first parasitic diode DA1 are connected in parallel, and the second switch SW2 and a second parasitic diode DA2 are connected in parallel. In the present embodiment, the first switch SW1 and the second switch SW2 are arranged in series, in which the direction of the first parasitic diode DA1 is opposite to the direction of the second parasitic diode DA2. In more detail, an anode of the first parasitic diode DA1 is connected to the second system ES2 side, and a cathode of the first parasitic diode DA1 is connected to the first system ES1 side. An anode of the second parasitic diode DA2 is connected to the first system ES1 side, and a cathode of the second parasitic diode DA2 is connected to the second system ES2 side.

The relay switch SMR is arranged on the second power supply path LA2. Specifically, the relay switch SMR is arranged between the second battery 16 and the connection node PB on the connection path LB. In the relay switch SMR, the third switch SW3, the second resistance element RE2 and the fourth switch SW4 are arranged in series in this order. The third switch SW3 is arranged closer to the connection node PB side than the fourth switch SW4 is.

The present embodiment uses the respective third and fourth switches SW3 and SW4 composed of MOS FETs. Accordingly, the third switch SW3 and a third parasitic diode DA3 are arranged in parallel. The fourth switch SW4 and a fourth parasitic diode DA4 are arranged in parallel. In the present embodiment, the third switch SW3 and the fourth switch SW4 are arranged in series, and the direction of the third parasitic diode DA3 is opposite to the direction of the fourth parasitic diode DA4. In more detail, an anode of the third parasitic diode DA3 is connected to the connection node PB side, and a cathode of the third parasitic diode DA3 is connected to the second battery 16 side. An anode of the fourth parasitic diode DA4 is connected to the second battery 16 side, and a cathode of the fourth parasitic diode DA4 is connected to the connection node PB side.

A current detector 28 is arranged on the connection path LB. The current detector 28 is connected in parallel to the first resistance element RE1 in the switching part 20. The current detector 28 detects a magnitude and direction of an intersystem current IA flowing in the connection path LB.

The controller 40 generates a first switching signal SC1 and a second switching signal SC2 based on a detection value provided from the current detector 28, and transmits the generated signals to the respective first and second switches SW1 and SW2. The first switch SW1 and the second switch SW2 are switched based on the received switching signals SC1 and SC2. Specifically, the first switch SW1 and the second switch SW2 are switched between the open state and the closed state when receiving the first switching signal SC1 and the second switching signal SC2. In the present embodiment, the controller 40 corresponds to the switching controller.

The controller 40 generates a first control signal SD1 and transmits the generated signal to the converter 12 so as to control the operation of the converter 12. The first control signal SD1 switches the converter 12 between the operation state and the stop state. The controller 40 further generates a third switching signal SC3 and a fourth switching signal SC4 and transmits the generated signals to the third switch SW3 and the fourth switch SW4 to switch the third switch SW3 and the fourth switch SW4. The third switch SW3 and the fourth switch SW4 are switched between the open state and the closed state based on the third switching signal SC3 and the fourth switching signal SC4.

The controller 40 is connected to a notification part 44, an IG switch 45 and an input part 46, and controls the operation of the IG switch 45 and the input part 46. The notification part 44 provides visual data and auditory data to notify the data to a driver of the vehicle, such as a display device, and a speaker device arranged in a compartment of the vehicle. The IG switch 45 corresponds to the starter switch of a vehicle. The controller 40 monitors the open state and closed state of the IG switch 45. The input part 46 corresponds to devices that may be operated by the driver of the vehicle, for example, a steering wheel, levers, buttons, pedals, and audio input device.

The controller 40 performs the manual transmission and the self-driving of vehicles by using the specific loads 32. The controller 40 is equipped with a known microcomputer composed of a CPU, A ROM, a RAM, a flash memory, etc. The CPU executes calculation programs with reference to program data stored in the ROM, and provides the functions to perform the manual transmission and the self-driving of the vehicles.

In the manual transmission, the driver manually operates the vehicle. On the other hand, in the self-driving, the controller 40 performs the self-driving without driver's manual transmission. Specifically, self-driving corresponds to self-driving that is not less than Level 3 in Levels 0 to 5 determined by the National Highway Traffic Safety Administration (NHTSA) as the agency of the U.S. federal government, part of the Department of Transportation. In Level 3, the controller 40 monitors driving environments and performs both steering wheel control acceleration/deceleration control.

When an overvoltage abnormality (hereinafter, the overvoltage only) occurs in any one of the first system ES1 and the second system ES2 in the closed state of the first system ES1 and the second system ES2, the controller 40 switches the first switch SW1 and the second switch SW2 to the open state. The overvoltage corresponds to a surge voltage generated when the power source voltage VA provided from the converter 12 abnormally increases, and also generated by the inductance component of each of the first system ES1 and the second system ES2. There might be a risk of occurring abnormality due to the supply of an excessive high voltage into the electric loads 34, 36 in each of the first system ES1 and the second system ES2 until the time when the first switch SW1 and the second switch SW2 are switched to the open state.

The present embodiment provides the structure configured to start charging of the second battery 16 before the first switch SW1 and the second switch SW2 are switched to the open state when overvoltage occurs in any one of the first system ES1 and the second system ES2. A description will now be given of this structure in detail.

The power source system 100 according to the present embodiment has the converters 21 as DC-DC converters, a switching part 22 and a discharging part 23. Hereinafter, the converter 12 is described as the first converter 12, and the converter 21 is described as the second converter 21. The switching part 20 is described as the first switching part 20, and the switching part 22 is described as the second switching part 22.

The second converter 21, the second switching part 22 and the discharging part 23 are arranged on the second power supply path LA2. Specifically, a charging path LC1, a discharging path LC2 and a short-circuit connection path LC3 are arranged in parallel between the connection node PB of the second power supply path LA2 and the relay switch SMR. The second converter 21 is arranged on the charging path LC1. The second switching part 22 is arranged on the discharging path LC2. The discharging part 23 is arranged on the short-circuit connection path LC3.

The second converter 21 receives electric power supplied from the first converter 12, and converts the received electric power to a high voltage more than the power source voltage VA of the supplied electric power. The second converter 21 supplies the converted high voltage to charge the second battery 16. That is, the second converter 21 is a voltage booster of the power source voltage VA. The second battery 16 is a battery chargeable by the power source voltage VA. In the present embodiment, the second converter 21 reduces the voltage VB of the second battery 16. That is, the second converter 21 is a bi-directional converter having voltage boosting and dropping functions.

The second switching part 22 has a fifth switch SW5 and a sixth switch SW6 connected in series. In the structure of the second switching part 22, the fifth switch SW5 is arranged closer to the relay switch SMR side than the sixth switch SW6 is. Each of the fifth switch SW5 and the sixth switch SW6 is composed of a MOS FET. Accordingly, the fifth switch SW5 and a fifth parasitic diode DA5 are connected in parallel, and the sixth switch SW6 and a sixth parasitic diode DA6 are connected in parallel. In the present embodiment, the fifth switch SW5 and the sixth switch SW6 are arranged in series, in which the direction of the fifth parasitic diode DA5 is opposite to the direction of the sixth parasitic diode DA6. In more detail, an anode of the fifth parasitic diode DA5 is connected to the connection node PB side, and a cathode of the fifth parasitic diode DA5 is connected to the relay switch SMR side. An anode of the sixth parasitic diode DA6 is connected to the relay switch SMR side, and a cathode of the sixth parasitic diode DA6 is connected to the connection node PB side.

The discharging part 23 has first to sixth diodes DD1 to DD6 connected in series. The first to sixth diodes DD1 to DD6 are connected to a seventh switch SW7. The seventh switch SW7 is arranged closer to the relay switch SMR side than the first to sixth diodes DD1 to DD6 are. In the present embodiment, the seventh switch SW7 is composed of a MOS FET. The seventh switch SW7 and a seventh parasitic diode DA7 are connected in parallel. An anode of the seventh parasitic diode DA7 is connected to the connection node PB side, and a cathode of the seventh parasitic diode DA7 is connected to the relay switch SMR side. A cathode of each of the first to sixth diodes DD1 to DD6 is connected to the connection node PB side, and an anode of each of the first to sixth diodes DD1 to DD6 is connected to the relay switch SMR side. That is, the forward direction of the seventh parasitic diode DA7 is arranged opposite to the forward direction of each of the first to sixth diodes DD1 to DD6. The first to sixth diodes DD1 to DD6 have the rectifier function to regulate the connection node PB from supplying electric power to the second battery 16.

The controller 40 generates a second control signal SD2 and transmits the second control signal SD2 to the second converter 21 so as to control the operation of the second control signal SD2. When receiving the second control signal SD2, the second converter 21 is switched between the operation state and the stop state based on the received second control signal SD2. The magnitude of the boosted voltage of the second converter 21, i.e., the voltage difference between the voltage VB of the second battery 16 and the power source voltage VA, is adjusted by the received second control signal SD2. The controller 40 generates fifth to seventh switching signals SC5 to SC7 and transmits the generated switching signals to the fifth to seventh switches SW5 to SW7, respectively. The controller 40 performs the switching operation of the fifth to seventh switches SW5 to SW7. When receiving the fifth to seventh switching signals SC5 to SC7, the fifth to seventh switches SW5 to SW7 are switched between the operation state and the stop state based on the received switching signals.

The controller 40 controls the charging and discharging operation of the second battery 16 based on the control signal and the switching signals. Specifically, the controller 40 controls the second converter 21, the second switching part 22 and the discharging part 23 based on the control signal and the switching signals. The second converter 21 charges the second battery 16 by the power source voltage VA in response to the first switch SW1 and the second switch SW2 being switched to the closed state. The second switching part 22 discharges the second battery 16 in response to a discharging request after completion of the charging of the second battery 16. In response to the seventh switch SW7 in the discharging part 23 being switched to the closed state, this structure makes it possible to quickly discharge the second battery 16 due to the load voltage VD, to be supplied to the connection node PB, which has been dropped less than the battery voltage VB. In the present embodiment, the load voltage VD corresponds to the voltage at the connection node.

The second converter 21, the second switching part 22 and the discharging part 23 prohibit the second battery 16 from charging and discharging under the closed state of the first switch SW1 and the second switch SW2 during a period counted from the completion time of the charging control by the second converter 21 to the receiving time of the discharging request. Specifically, the second converter 21 stops the boosting operation and prohibits the second battery 16 from charging. The second switching part 22 prohibits the second battery 16 from discharging in response to the fifth and sixth switches SW5, SW6 being switched to the open state. The discharging part 23 prohibits the second battery 16 from discharging due to the forward voltage of the first to sixth diodes DD1 to DD6. In the present embodiment, the second converter 21 and the second switching part 22 correspond to the prohibition part, and the charging path LC1, the discharging path LC2 and the short-circuit connection path LC3 correspond to the first path.

When overvoltage occurs in any one of the first system ES1 and the second system ES2 during the prohibition period to prohibit the second battery 16 from charging and discharging, it is difficult for the second battery 16 to receive overvoltage until the second converter 21 restarts the boosting or the controller 40 switches the fifth switch SW5 and the sixth switch SW8 to the closed state. Because the controller 40 performs the voltage boosting of the second converter 21 or switches the fifth switch SW5 and the sixth switch SW6 to the closed state, simultaneously or after the controller 40 switches the first switch SW1 and the second switch SW2 to the open state, it is difficult to charge the second battery 16 before the first switch SW1 and the second switch SW2 are switched to the open state.

The present embodiment has an overvoltage connection path LC4. The overvoltage connection path LC4, the charging path LC1, the discharging path LC2 and the short-circuit connection path LC3 are arranged in parallel to each other. A connection part 24 is arranged on the overvoltage connection path LC4. The connection part 24 is composed of an eight switch SW8 and a seventh diode DD7. In the present embodiment, the overvoltage connection path LC4 corresponds to the second path.

The eighth switch SW8 is arranged closer to the relay switch SMR side than the seventh diode DD7 is. In the present embodiment, the eighth switch SW8 is composed of a MOS FET. The eighth switch SW8 and an eighth parasitic diode DA8 are connected in parallel. An anode of the eighth parasitic diode DA8 is connected to the relay switch SMR side, and a cathode of the eighth parasitic diode DA8 is connected to the connection node PB side. The controller 40 generates an eighth switching signal SC8 and transmits the generated switching signal to the eighth switch SW8 so as to switch the eighth switch SW8. The eighth switch SW8 is switched between the open state and the closed state based on the eighth switching signal SC8.

A cathode of the seventh parasitic diode DD7 is connected to the relay switch SMR side, and an anode of the seventh parasitic diode DD7 is connected to the connection path LB side. The eighth parasitic diode DA8 and the seventh diode DD7 are arranged, and the direction of the eighth parasitic diode DA8 is opposite to the direction of the seventh diode DD7. The seventh diode DD7 has a rectifier function for prohibiting the second battery 16 from supplying electric power to the connection node PB. The seventh diode DD7 provides a forward voltage which prohibits the connection node PB from supplying electric power to the second battery 16.

Specifically, the seventh diode DD7 provides a predetermined amount of a forward voltage drop (for example, 0.7 V). This generates a reference voltage difference $\Delta VK$, due to the predetermined forward voltage drop amount, between the voltage VB of the second battery 16 supplied to the relay switch SMR side and the load voltage VD supplied to the connection node PB side in the connection part 24 under the situation in which the third switch SW3, the fourth switch SW4, and the eight switch SW8 in the relay switch SMR are switched to the closed state.

Accordingly, the seventh diode DD7 prohibits the connection node PB from supplying electric power to the second battery 16 in response to a voltage difference $\Delta V$ between the load voltage VD and the battery voltage VB, which is calculated by subtracting the battery voltage VB from the load voltage VD, being less than the reference voltage difference $\Delta VK$. When the voltage difference $\Delta V$ previously described is greater than the reference voltage difference $\Delta VK$, the seventh diode DD7 allows the connection node PB to supply electric power to the second battery 16. In the present embodiment, the reference voltage difference $\Delta VK$ corresponds to the predetermined threshold voltage, and the total value of the battery voltage VB and the reference voltage difference $\Delta VK$ corresponds to the upper limit value. The seventh diode DD7 corresponds to the power supply control circuit.

This structure makes it possible to start the charging of the second battery 16 before the control process of the controller 40 for performing at a predetermined control period when the voltage difference $\Delta V$ becomes greater than the reference voltage difference $\Delta VK$ and when overvoltage occurs in any one of the first system ES1 and the second system ES2 under the situation in which the first switch SW1 and the second switch SW2 are switched to the closed state. As a result, this control makes it possible to start the charging of the second battery 16 before the controller 40 performs the control process every predetermined period. Specifically, this structure makes it possible to start the charging of the second battery 16 before the controller 40 switches the first switch SW1 and the second switch SW2 to the open state from the closed state. Further, this structure makes it possible to start the charging of the second battery 16 before the controller starts the voltage boosting of the second converter 21 or before the fifth switch SW5 and the sixth switch SW6 are switched to the closed state. In the present embodiment, the second converter 21 and the second switching part 22, the discharging part 23 and the connection part 24 correspond to the charging discharging part.

The present embodiment switches the first switch SW1 and the second switch SW2 to the open state from the closed state under the situation where the second battery 16 is charged before the first switch SW1 and the second switch SW2 are switched to the open state. Specifically, the charging current flows in the second resistance element RE2 in the relay switch SMR. The present embodiment further has an intersystem switching part 29 in addition to the controller 40. The intersystem switching part 29 switches the first switch SW1 and the second switch SW2 between the close state and the open state, independently from the control of the controller 40.

The intersystem switching part 29 and the second resistance element RE2 in the relay switch SMR are arranged in parallel. The intersystem switching part 29 generates an intersystem signal SE due to the charging current flowing in the second battery 16. The intersystem switching part 29 transmits the intersystem signal SE to the first switch SW1 and the second switch SW2, the first switch SW1 and the second switch SW2 are switched between the open state and the closed state based on the received intersystem signal SE. That is, the first switch SW1 and the second switch SW2 are switched between the open state and the closed state based on the first switching signal SC1, the second switching signal SC2 and the intersystem signal SE.

Figure 2:
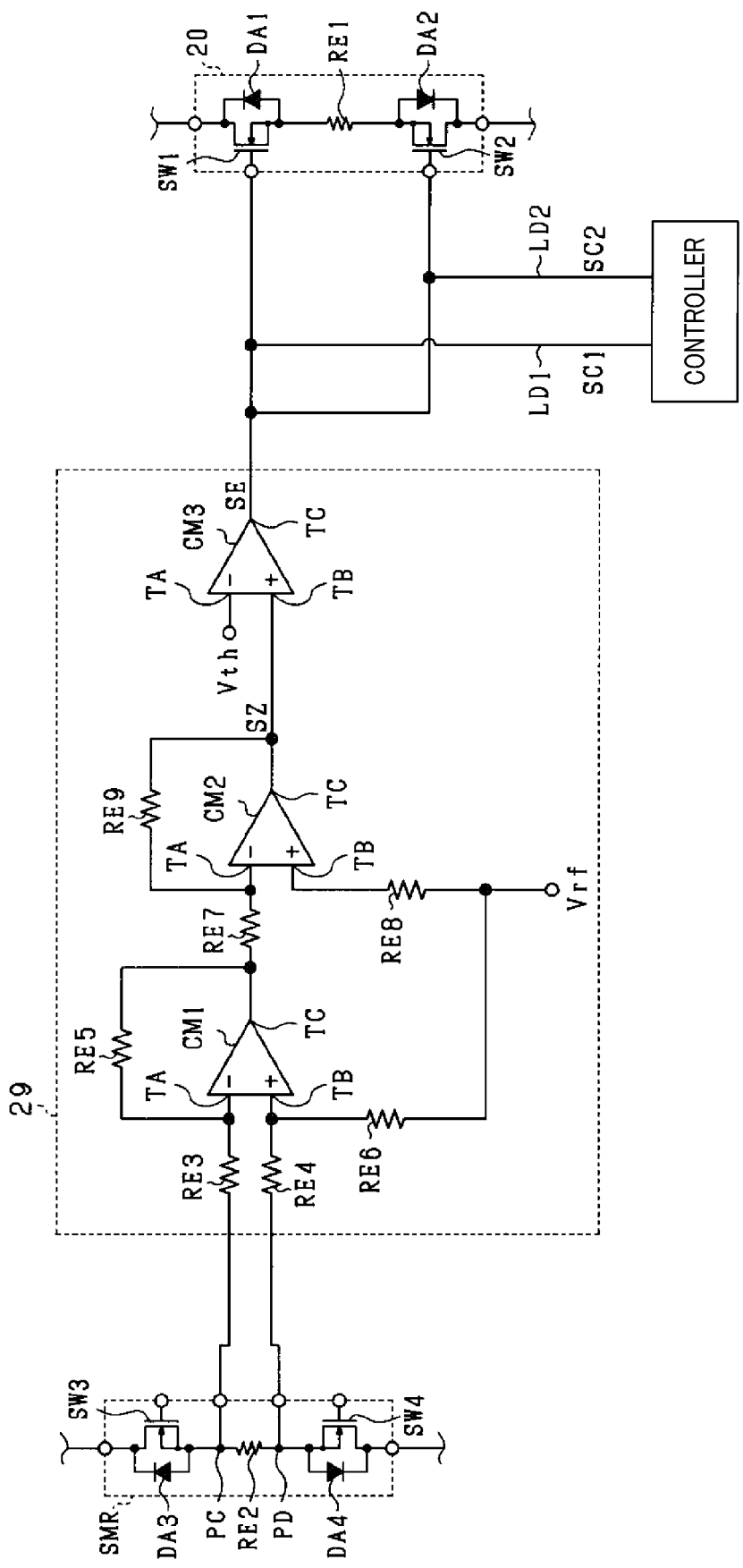
FIG. 2 is a view showing a structure of an intersystem switching part.

FIG. 2 shows a structure of the intersystem switching part 29. The intersystem switching part 29 has first to third comparators CM1 to CM3, and third to ninth resistance elements RE3 to RE9. Through the third resistance element RE3, an inverting input terminal TA of the first comparator CM1 is connected to an intermediate node PC between the third switch SW3 and the second resistance element RE2. The inverting input terminal TA of the first comparator CM1 is connected to an output terminal TC of the first comparator CM1 through the fifth resistance element RE5. Through the fourth resistance element RE4, a non-inverting input terminal TB of the first comparator CM1 is connected to an intermediate node PD between the second resistance element RE2 and the fourth switch SW4. A predetermined reference voltage Vrf is supplied to the non-inverting input terminal TB of the first comparator CM1 through the sixth resistance element RE6.

An inverting input terminal TA of the second comparator CM2 is connected to the output terminal TC of the first comparator CM1 through the seventh resistance element RE7. The inverting input terminal TA of the second comparator CM2 is connected to the output terminal TC of the second comparator CM2 through the ninth resistance element RE9. A non-inverting input terminal TB of the second comparator CM2 is connected to the voltage power source for supplying the predetermined reference voltage Vrf through the eighth resistance element RE8. In this structure, a charging current flows in the second resistance element RE2. A voltage difference is generated at the second resistance element RE2 due to the current flowing in the second resistance element RE2. The first comparator CM1 and the second comparator CM2 amplifies the voltage difference, and generates an amplifier signal SZ. The output terminal TC of the second comparator CM2 provides the amplifier signal SZ. The greater the magnitude of the amplifier signal SZ increases, the greater the charging current flowing in the second resistance element RE2 increases.

An inverting input terminal TA of the third comparator CM3 receives the predetermined reference voltage Vth. A non-inverting input terminal TB of the third comparator CM3 is connected to the output terminal TC of the second comparator CM2.

The predetermined reference voltage Vth corresponds to the voltage difference generated in the second resistance element RE2 when the charging current as the predetermined threshold current Ith flows in the second resistance element RE2. The predetermined threshold current Ith is greater than the charging current flowing in the second converter 21. The third comparator CM3 transmits the intersystem signal SE to the first switch SW1 and the second switch SW2 through the output terminal TC in response to the amplifier signal SZ transmitted from the second comparator CM2 being less than the predetermined reference voltage Vth. The first switch SW1 and the second switch SW2 are switched to the closed state from the open state due to the intersystem signal SE. The third comparator CM3 transmits the intersystem signal SE to the first switch SW1 and the second switch SW2 through the output terminal TC in response to the amplifier signal SZ being greater than the predetermined reference voltage Vth. The first switch SW1 and the second switch SW2 are switched to the open state from the closed state based on the intersystem signal SE.

The output terminal TC of the third comparator CM3 is connected to a first wiring LD1 through which the controller 40 is connected to the gate terminal of the first switch SW1. Further, the output terminal TC of the third comparator CM3 is connected to a second wiring LD2 through which the controller 40 is connected to the gate terminal of the second switch SW2. This structure allows the intersystem switching part 29 to switch the first switch SW1 and the second switch SW2 between the closed state and the open state, independently from the control of the controller 40.

Accordingly, the intersystem switching part 29 switches the first switch SW1 and the second switch SW2 to the open state from the closed state when a current flows between the connection node PB and the second battery 16, which is greater than the predetermined threshold current Ith, under the situation in which the start of the charging operation of the second battery 16 has started after overvoltage occurs in any one of the first system ES1 and the second system ES2. As a result, this structure makes it possible to quickly switch the first switch SW1 and the second switch SW2 to the open state from the closed state before the periodic process of the controller 40.

Figure 3:
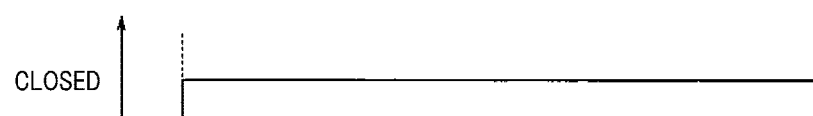
FIG. 3 is a timing chart showing a process of receiving overvoltage.
Figure 3:
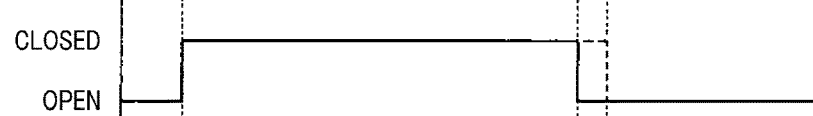
Figure 3:
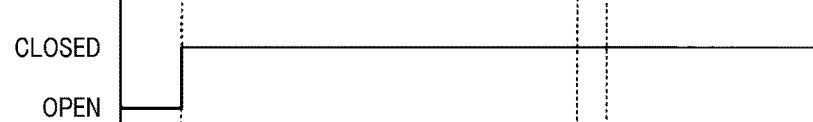
Figure 3:
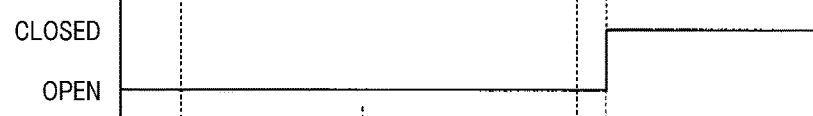
Figure 3:
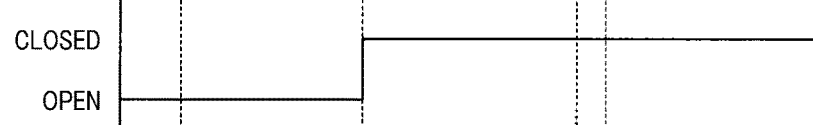
Figure 3:
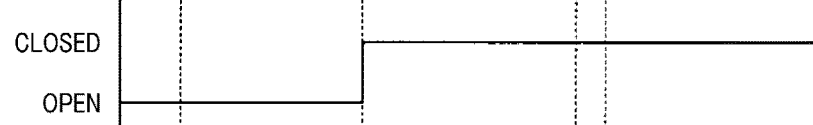
Figure 3:
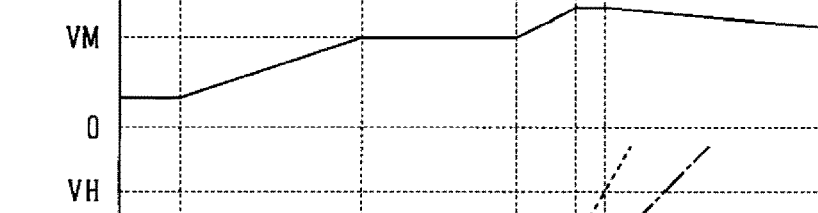
Figure 3:
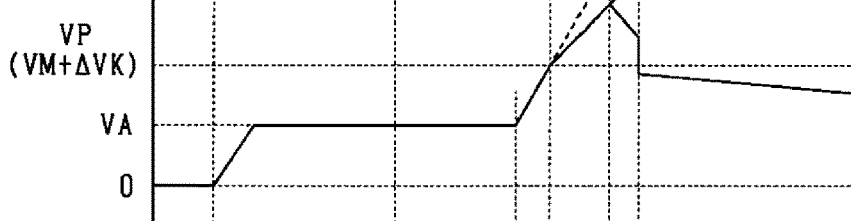
Figure 3:
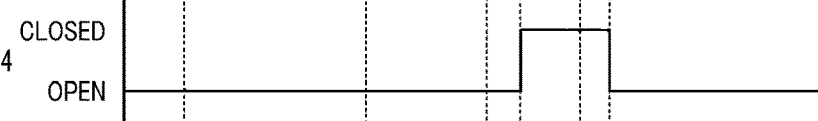
Figure 3:
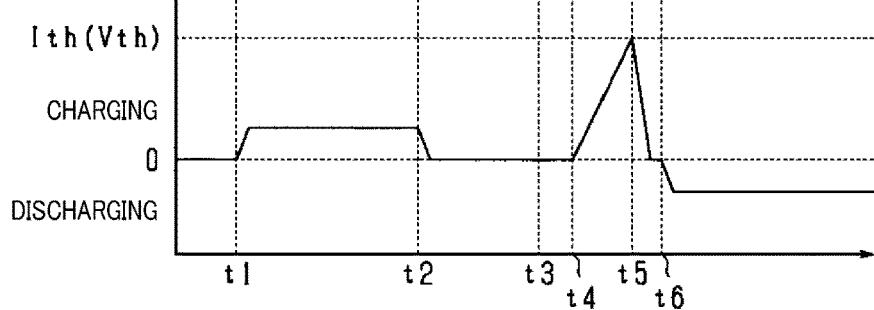
Figure 4:
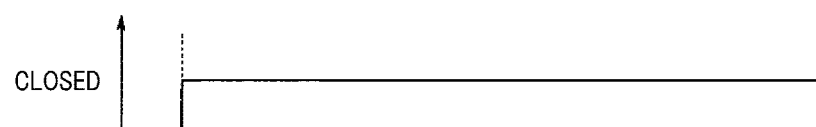
FIG. 4 is a timing chart showing the process of receiving overvoltage.
Figure 4:
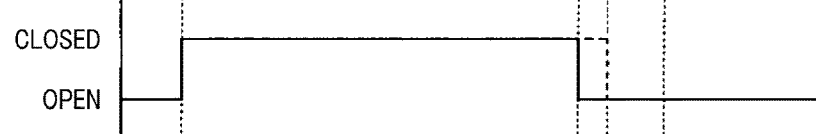
Figure 4:
Figure 4:
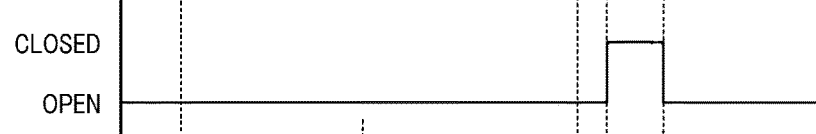
Figure 4:
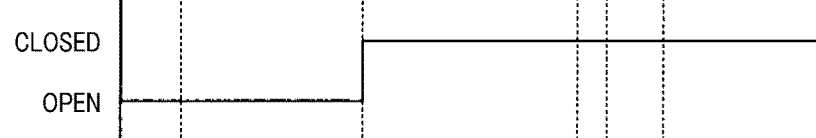
Figure 4:
Figure 4:
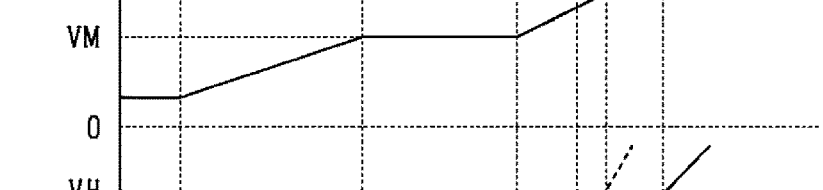
Figure 4:
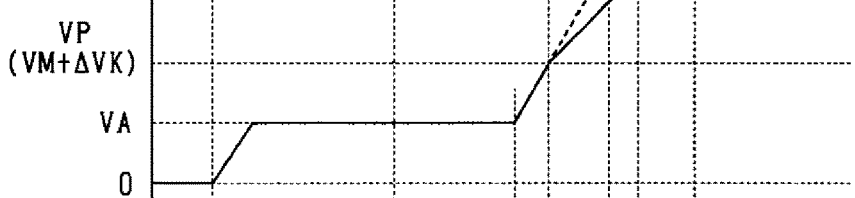
Figure 4:
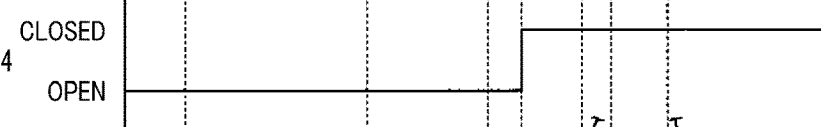
Figure 4:
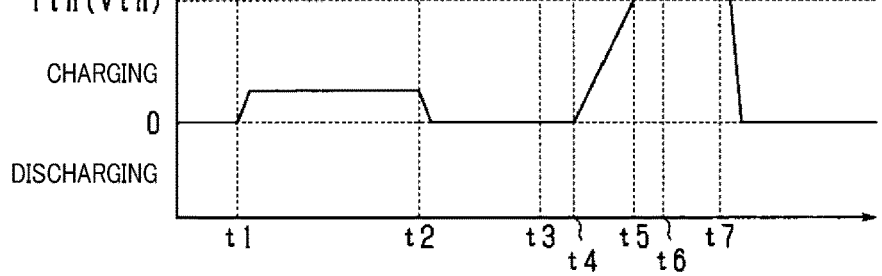

FIG. 3 and FIG. 4 show one example of the process of receiving overvoltage by the second battery 16. FIG. 3 shows a transition of the battery voltage VB and the load voltage VD when overvoltage occurs in the first system ES1 during vehicle traveling.

In FIG. 3 and FIG. 4, (A) designates a transition of the IG switch 45, (B) indicates a transition of the open state and the closed state of the first switch SW1 and the second switch SW2 and (C) designates a transition of the open state and the closed state of the third switch SW3 and the fourth switch SW4. Further, (D) indicates a transition of the open state and the closed state of the fifth switch SW5 and the sixth switch SW6, (E) indicates a transition of the open state and the closed state of the seventh switch SW7 and (F) indicates a transition of the open state and the closed state of the eighth switch SW8. Still further, (G) indicates a transition of the battery voltage VB, (H) indicates a transition of the load voltage VD, and (I) designates a transition of the closed state and the open state of the connection part 24, and (J) indicates a transition of the in-system current IB which shows a current flowing in the second battery 16. In this case, the open state of the connection part 24 indicates that the charging current flows in the second battery 16 through the connection part 24. The closed state of the connection part 24 indicates that no charging current flows in the second battery 16 through the connection part 24.

As shown in FIG. 3, during the time period counted to timing t1 from the open state of the IG switch 45, during the stop state of the power source system 100, the first to eighth switches SW1 to SW8 are switched to the open state, and the first converter 12 and the second converter 21 have been stopped. Accordingly, the connection part 24 becomes open, and the load voltage VD and the in-system current IB are zero during the open state of the IG switch 45.

In response to the IG switch 45 being switched to the closed state at timing t1, the controller 40 switches the first switch SW1 and the second switch SW2 to the closed state. The controller 40 further transmits an instruction signal to the first converter 12. This instruction signal switches the first converter 12 to the operation state. The load voltage VD increases to the power source voltage VA. This allows the vehicle to run.

At timing t1, the controller 40 switches the third switch SW3 and the fourth switch SW4 to the closed state, and transmits an instruction signal to the second converter 21. This instruction signal switches the second converter 21 to the operation state. This operation makes it possible to start the charging of the second battery 16 through the second converter 21. As a result, the battery voltage VB increases to a predetermined boost voltage VM (see FIG. 3(G)) greater than the power source voltage VA.

It is also acceptable for the second converter 21 to temporarily perform the voltage drop operation instead of the voltage boosting operation during the charging period of the second battery 16. This control makes it possible to detect whether the second converter 21 and the relay switch SMR correctly work during the charging period of the second battery 16.

When the battery voltage VB increases to the predetermined boost voltage VM at timing t2, the controller 40 transmits the instruction signal to the second converter 21 so as to stop the operation of the second converter 21. The second converter 21 thereby prohibits the second battery 16 from charging. The controller 40 switches the seventh switch SW7 and the eighth switch SW8 to the closed state at timing t2, and the controller 40 maintains the open state of the fifth switch SW5 and the sixth switch SW6. In the discharging part 23, the first to sixth diodes DD1 to DD6 prohibit the battery from discharging even when the seventh switch SW7 is switched to the closed state. It is accordingly possible to maintain the prohibition of charging and discharging of the second battery 16 by the second converter 21, the second switching part 22 and the discharging part 23. This allows the vehicle to run under the prohibition state of the second battery 16 after timing t2.

The power source system of the present embodiment detects whether overvoltage occurs in any one of the first system ES1 and the second system ES2 during vehicle traveling. When no overvoltage occurs in any one of the first system ES1 and the second system ES2, the closed state of the first switch SW1 and the second switch SW2 is maintained. This makes it possible for the first converter 12 and the first battery 14 to supply electric power to the first load 34 and the second load 36, respectively. The power supply of the first converter 12 makes it possible to perform the continuous power supply for a long period even during the self-driving. The power supply of the first battery 14 allows the power source system to supply electric power with less voltage fluctuation. During the period counted from timing t2 to timing t3, the manual transmission or self-driving are performed by using the first load 34 and the second load 36.

When detecting that overvoltage occurs in one of the first system ES1 and the second ES2, the controller 40 switches the first switch SW1 and the second switch SW2 to the open state. In FIG. 3, the overvoltage occurs in the first system ES1 at timing t3. The load voltage VD thereby increases and the intersystem current IA increases. The controller 40 switches the first switch SW1 and the second switch SW2 to the open state at timing t6 (see the dashed line shown in FIG. 3(B)) when the current detector 28 detects the increasing of the intersystem current IA. The controller switches the fifth switch SW5 and the sixth switch SW6 to the closed state. This control makes it possible for the second battery 16 to start the power supply to the second load 36 through the discharging path LC2. This control allows the vehicle to continue the continuous traveling.

However, there might be a risk of increasing the load voltage VD and exceeding the upper limit voltage VH of the first load 34 and the second load 36 when the first switch SW1 and the second switch SW2 are maintained in the closed state until timing t6, as indicated by the dotted line shown in FIG. 3(H). In this case, an excessive high voltage is supplied to the first load 34 and the second load 36, and there might be a risk of causing malfunctioning of those loads due to the high voltage supply.

The present embodiment provides the structure in which the connection part 24 is switched to the closed state when the load voltage VD increases to a received voltage VP, which is greater than the predetermined boost voltage VM by the reference voltage difference ΔVK, at timing t4 before timing t6 when overvoltage occurs at timing t3 in the first system ES1. The charging of the second battery 16 starts at timing t4. The control previously described makes it possible to prohibit the first load 34 and the second load 36 from receiving a high voltage power supply. Specifically, the current flowing in the first load 34 and the second load 36 is reduced when the charging of the second battery 16 starts, and this also reduces a rising speed of the load voltage VD. As designated by the alternate long and short dash line shown in FIG. 3(H), it is possible to prohibit the load voltage VD from increasing greater than the upper limit voltage VH until timing t6.

A charging current increases in the second battery 16 after the charging of the second battery 16 starts When the in-system current IB increases to the predetermined threshold current Ith at timing t5 before timing t6, the intersystem switching part 29 switches the first switch SW1 and the second switch SW2 to the open state. This control makes it possible to prohibit the influence due to the overvoltage occurred in the first system ES1 from being propagated into the second system ES2 where no overvoltage occurs.

When the controller 40 switches the fifth switch SW5 and the sixth switch SW6 to the closed state at timing t6, the load voltage VD becomes equivalent to the battery voltage VB, and the second switching part 22 starts the discharging of the second battery 16. In the present embodiment previously described, because the battery voltage VB at timing t6 is less than the received voltage VP, the load voltage VD is reduced less than the received voltage VP, and the connection part 24 is switched to the open state at timing t6.

FIG. 4 shows the transition of the battery voltage VB and the load voltage VD when overvoltage occurs in the second system ES2 at timing t3 during vehicle traveling. In FIG. 4, because the processes until timing t5 are equivalent to the processes in FIG. 3, the explanation of the same processes is omitted for brevity.

As shown in FIG. 4, the intersystem switch 29 switches the first switch SW1 and the second switch SW2 to the open state when the in-system current IB increases to the predetermined threshold current Ith at timing t5. This control makes it possible to suppress the influence of overvoltage occurring in the second system ES2 from being propagated to the first system ES1 where no overvoltage occurs.

At timing t6, the controller 40 switches the fifth switch SW5 and the sixth switch SW6 to the closed state. However, because the charging of the second battery 16 is continued even when the first switch SW1 and the second switch SW2 are switched to the open state when overvoltage occurs in the second system ES2, this control maintains the load voltage VD to be higher than the received voltage VP.

In the present embodiment, the controller 40 detects the load voltage VD after timing t6, and detects whether the detected load voltage VD is greater than the received voltage VP. When the load voltage VD is greater than the received voltage VP, the controller 40 determines that overvoltage has occurred in the second system ES2, and switches the third switch SW3 and the fourth switch SW4 to the open state at timing t7. This control of the controller 40 prohibit the charging of the second battery 16, and prohibits the second battery 16 from being overcharged. In the present embodiment, the received voltage VP corresponds to the predetermined reference voltage.

The present embodiment previously described in detail provides the following effects.

The present embodiment provides the structure in which the charging of the second battery 16 is started before the first switch SW1 and the second switch SW2 are switched to the open state when overvoltage occurs in any one of the first system ES1 and the second system ES2. This structure makes it possible to allow the second battery 16 to receive overvoltage, and to prohibit an excessively high voltage greater than the upper limit voltage VH from being supplied to the first load 34 and the second load 36. As a result, this makes it possible for the first load 34 and the second load 36 to work correctly even if overvoltage occurs.

The present embodiment provides the structure in which the second converter 21, the second switching part 22 and the discharging part 23 are arranged between the relay switch SMR and the connection node PB of the second power supply path LA2. This structure makes it possible to prohibit the second battery 16 from charging and discharging during a period counted to the time of receiving the discharging request from the completion time of the charging of the second battery 16. This makes it possible to maintain the battery voltage VB of the second battery 16 at a desired voltage based on the power source voltage VA when the second battery 16 in the second system ES2 supplies electric power in response to the discharging request. On the other hand, it might risk causing a time delay of the charging start of the second battery 16 when overvoltage occurs in any one of the first system ES1 and the second system ES2 during the prohibition period of charging and discharging.

The present embodiment further has the connection part 24 that is arranged between the relay switch SMR and the connection node PB of the second power supply path LA2. The connection part 24 connects between the connection node PB and the relay switch SMR, i.e., between the connection node PB and the second battery 16 during the prohibition period of charging and discharging of the second battery 16 before the first switch SW1 and the second switch SW2 are switched to the open state when overvoltage occurs in any one of the first system ES1 and the second system ES2 during the prohibition period. This control makes it possible for the second battery 16 to receive overvoltage during the prohibition period of charging and discharging of the second battery 16. It is thereby possible for the first load 34 and the second load 36 to correctly work in response to the discharging request and the occurrence of overvoltage.

Specifically, the present embodiment provides the structure in which the overvoltage connection path LC4 and the charging path LC1, the discharging path LC2 and the short-circuit connection path LC3 are arranged in parallel, where the second converter 21, the second switching part 22 and the discharging part 23 are arranged on the charging path LC1, the discharging path LC2 and the short-circuit connection path LC3, respectively, and the connection part 24 is arranged on the overvoltage connection path LC4. This structure makes it possible to connect the second battery 16 to connect the connection node PB through the overvoltage connection path LC4 when overvoltage occurs during the prohibition period of the charging path LC1, the discharging path LC2 and the short-circuit connection path LC3, where the prohibition period is determined by the second converter 21, the second switching part 22 and the discharging part 23. This structure makes it possible for the second battery 16 to receive overvoltage during the prohibition period.

In the structure of the present embodiment, the seventh diode DD7 corresponds to the connection part 24. The seventh diode DD7 is arranged on the overvoltage connection path LC4. This structure prohibits the connection node PB from supplying electric power to the second battery 16 in response to the voltage difference $\Delta V$ between the load voltage VD and the battery voltage VB being less than the reference voltage difference $\Delta VK$ due to the amount of the predetermined forward voltage drop of the seventh diode DD7. In response to the voltage difference $\Delta V$ previously described being greater than the reference voltage difference $\Delta VK$, the seventh diode DD7 allows the connection node PB to supply electric power to the second battery 16. Accordingly, when overvoltage occurs in any one of the first system ES1 and the second system ES2 and the voltage difference $\Delta V$ becomes greater than the reference voltage difference $\Delta VK$, the structure previously described withdraws the prohibition using the seventh diode DD7, and the second battery 16 thereby receives the overvoltage through the overvoltage connection path LC4. The seventh diode DD7 is a hardware element. This makes it possible for the second battery 16 to quickly receive overvoltage in response to the state in which the voltage difference $\Delta V$ between the load voltage VD and the battery voltage VB becomes greater than the reference voltage difference $\Delta VK$.

The structure of the present embodiment detects the increasing of the battery voltage VB based on the voltage difference $\Delta V$ between the load voltage VD and the battery voltage VB. This makes it possible to correctly detect the increasing of the voltage battery VB based on the battery voltage VB as a reference voltage.

In the present embodiment, the intersystem switching part 29 is arranged in addition to the controller 40. The intersystem switching part 29 switches the first switch SW1 and the second switch SW2 between the closed state and the open state, independently from the control of the controller 40. In the structure of the present embodiment, the intersystem switching part 29 switches the first switch SW1 and the second switch SW2 to the open state before the controller switches the first switch SW1 and the second switch SW2 to the open state when the in-system current IB becomes greater than the predetermined threshold current Ith between the connection node PB and the second battery 16 in response to the occurrence of overvoltage in any one of the first system ES1 and the second system ES2. This control makes it possible to quickly switch the first switch SW1 and the second switch SW2 to the open state on occurring overvoltage, and makes it possible to prohibit the influence of overvoltage occurred in one system from being propagated to the other system. In this situation, although the switching time, when the first switch SW1 and the second switch SW2 are switched to the open state, is delayed from the start time when the second battery 16 receives overvoltage, the structure of the present embodiment prohibits an excessive high voltage from being supplied to the first load 34 in the first system ES1 and the second load 36 in the second system ES2 by the quick start operation of the second battery 16 to receive the overvoltage. This control makes it possible to quickly suppress a risk due to the delay of the switching time.

When overvoltage occurs in the first system ES1, because the charging of the second battery 16 is completed by switching the first switch SW1 and the second switch SW2 to the open state, this charging avoids the second battery 16 from being overcharged. On the other hand, when overvoltage occurs in the second system ES2, because the charging of the second battery 16 is continued even when the first switch SW1 and the second switch SW2 have been switched to the open state, there might be a risk of occurring the overcharge of the second battery 16. That is, in order to correctly protect the second battery 16, it is necessary to switch the control processes of the second battery 16 in response to the situation whether overvoltage occurs in the first system ES1 or the second system ES2.

In order to solve the drawback, the present embodiment has the structure for switching the third switch SW3 and the fourth switch SW4 to the open state so as to disconnect the second battery 16 from the connection node PB in response to the load voltage VD being greater than the received voltage VP even when the first switch SW1 and the second switch SW2 are switched to the open state. This control makes it possible to correctly protect the second battery 16 from overvoltage occurred in the second system ES2.

Modification of First Embodiment

Figure 5:
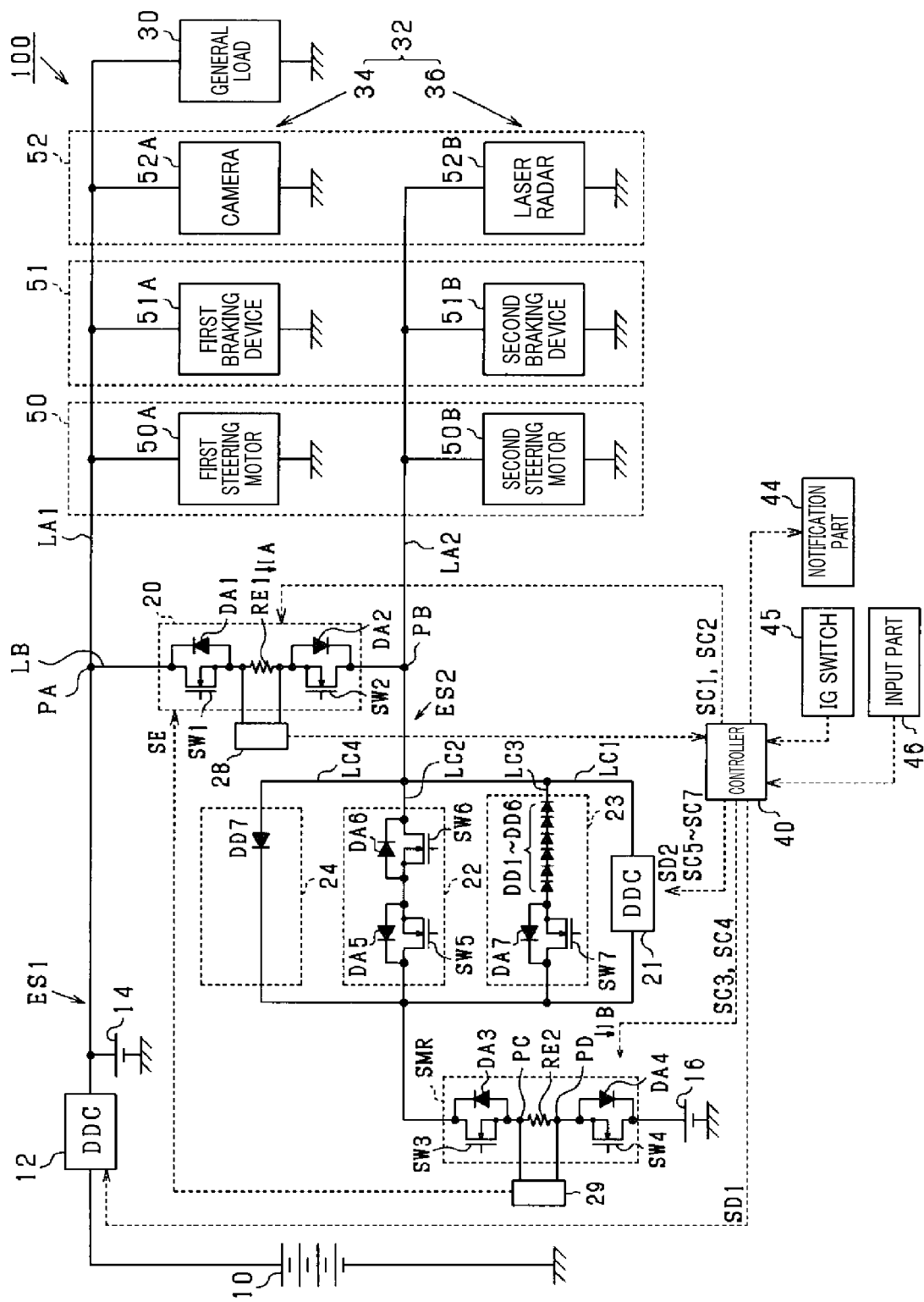
FIG. 5 is a view showing a modification of the overall structure of the power source system according to the first embodiment.

As shown in FIG. 5, it is acceptable to eliminate the eighth switch SW8 from the connection part 24, i.e., it is acceptable for the connection part 24 to have the seventh diode DD7 only.

Second Embodiment

Figure 6:
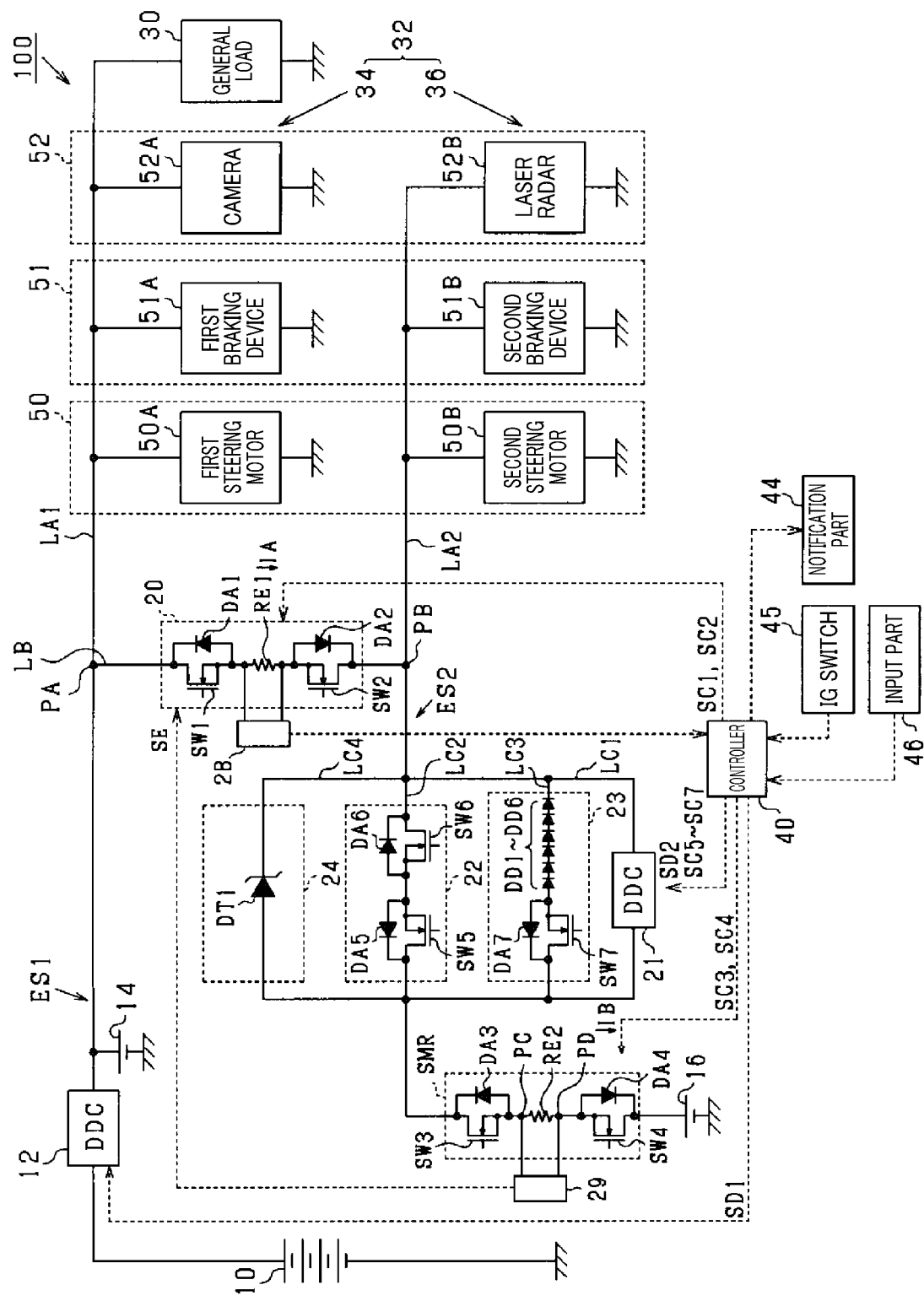
FIG. 6 is view showing an overall structure of the power source system according to a second embodiment.

Hereinafter, a description will now be given of the second embodiment. The following description explains a difference between the second embodiment and the first embodiment with reference to FIG. 6.

In the present embodiment, the connection part 24 is composed of a first Zener diode DT1, which is different in structure from the first embodiment. A cathode of the first Zener diode DT1 is connected to the connection path LB side, and an anode of the first Zener diode DT1 is connected to the relay switch SMR side. The rectifier function of the first Zener diode DT1 prohibits the connection node PB from supplying electric power to the second battery 16.

The first Zener diode DT1 has a predetermined breakdown voltage VZ. The present embodiment provides a structure in which the predetermined breakdown voltage VZ of the first Zener diode DT1 is greater than the voltage difference $\Delta V$ between the load voltage VD and the battery voltage VB when no overvoltage occurs in each of the first system ES1 and the second system ES2. In response to the voltage difference ΔV being less than the predetermined breakdown voltage VZ, the rectifier function of the first Zener diode DT1 prohibits the connection node PB from supplying electric power to the second battery 16. Further, in response to the voltage difference ΔV being greater than the predetermined breakdown voltage VZ, electric power is supplied to the second battery 16 through the connection node PB because the rectifier function of the first Zener diode DT1 does not work. In the present embodiment, the predetermined breakdown voltage VZ corresponds to the predetermined threshold voltage, and the first Zener diode DT1 corresponds to the power supply control circuit.

Accordingly, the charging of the second battery 16 starts when the voltage difference ΔV becomes greater than the reference voltage difference ΔVK and overvoltage occurs in any one of the first system ES1 and the second system ES2 under the situation in which the second converter 21, the second switching part 22 and the discharging part 23 prohibit the charging and discharging of the second battery 16, and the first switch SW1 and the second switch SW2 are switched to the closed state. As a result, it is possible to quickly start the charging of the second battery 16 before the controller 40 performs the control process at a predetermined control period.

In the present embodiment previously described, the first Zener diode DT1 is arranged as the connection part 24 on the overvoltage connection path LC4. The rectifier function of the first Zener diode DT1 prohibits the connection node PB from supplying electric power to the second battery 16 in response to the voltage difference ΔV between the load voltage VD and the battery voltage VB being less than the predetermined breakdown voltage VZ. The power supply from the connection node PB to the second battery 16 is allowed when the voltage difference ΔV is greater than the predetermined breakdown voltage VZ. Accordingly, when the voltage difference ΔV is greater than the predetermined breakdown voltage VZ due to the occurrence of overvoltage in any one of the first system ES1 and the second system ES2, it is possible for the second battery 16 to receive the overvoltage through the overvoltage connection path LC4 because of withdrawing the prohibition using the first Zener diode DT1. Further, because the first Zener diode DT1 is a hardware element, this makes it possible to allow the second battery 16 to quickly receive overvoltage when the voltage difference ΔV becomes greater than the reference voltage difference ΔVK.

Third Embodiment

Figure 7:
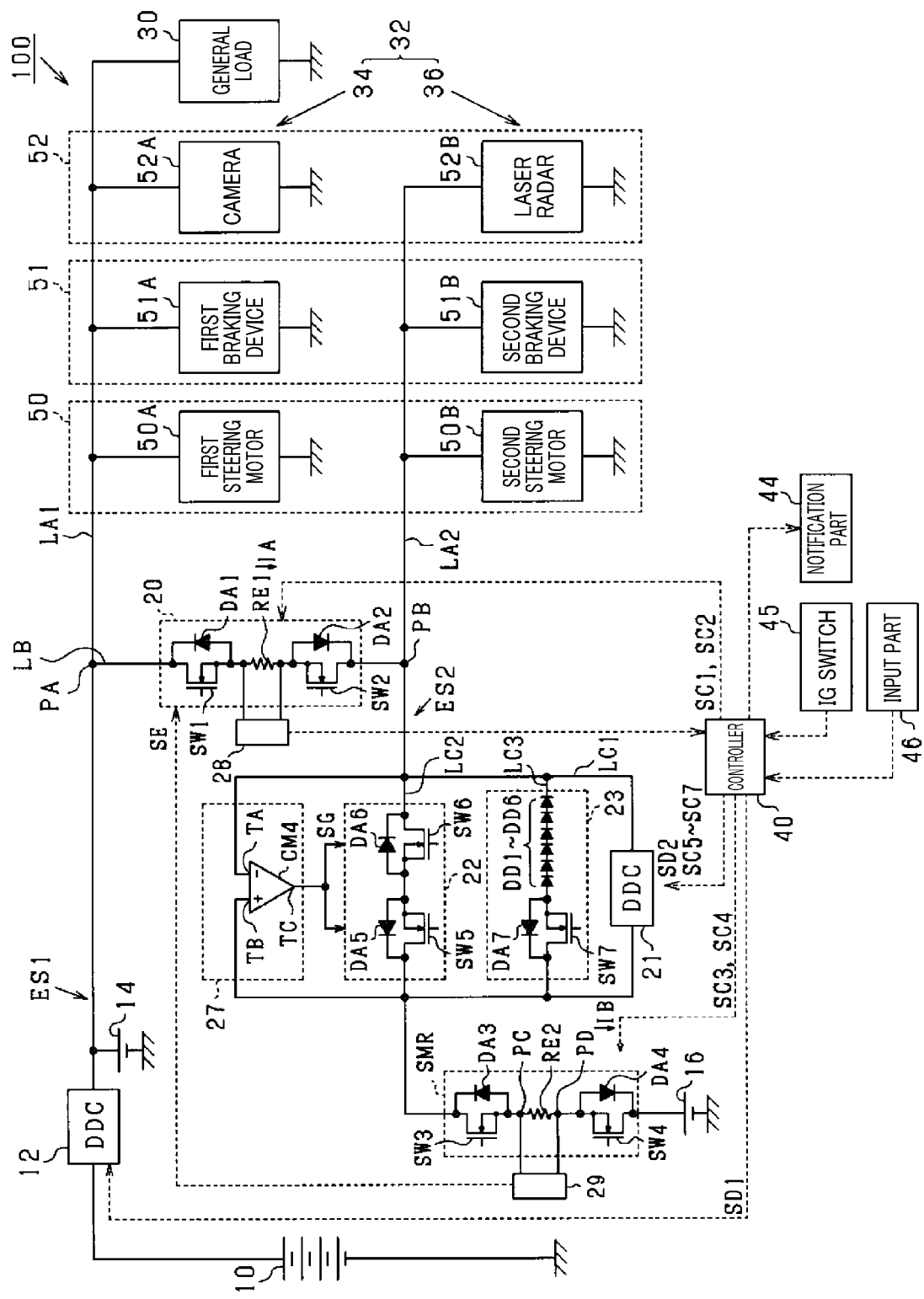
FIG. 7 is view showing an overall structure of the power source system according to a third embodiment.

Hereinafter, a description will now be given of the third embodiment. The following description explains a difference between the third embodiment and the first embodiment with reference to FIG. 7.

The present embodiment provides a structure in which the connection part 24 and the overvoltage connection path LC4 are not provided, which is different in structure from the first embodiment. Further, the present embodiment has an in-system switching part 27 for switching the fifth switch SW5 and the sixth switch SW6 between the closed state and the open state, independently from the control of the controller 40, which is also different in structure from the first embodiment. In the present embodiment, the second converter 21, the second switching part 22, the discharging part 23, and the in-system switching part 27 correspond to the charging discharging part.

The in-system switching part 27 and the second switching part 22 are arranged parallel to each other. The in-system switching part 27 generates an in-system switching signal SG based on a voltage difference ΔV between the load voltage VD and the battery voltage VB. The in-system switching part 27 transmits the in-system switching signal SG to the fifth switch SW5 and the sixth switch SW6. When receiving the in-system switching signal SG, the fifth switch SW5 and the sixth switch SW6 are switched between the closed state and the open state. That is, the fifth switch SW5 and the sixth switch SW6 are switched between the closed state and the open state based on the fifth switching signal SC5, the sixth switching signal SC6 and the in-system switching signal SG.

Specifically, the in-system switching part 27 has a fourth comparator CM4. An inverting input terminal TA of the fourth comparator CM4 is connected to the connection node PB side in the second switching part 22, i.e., connected to a main terminal of the sixth switch SW6, where the fifth switch SW5 and the sixth switch SW6 are connected in series. A negative voltage VD is supplied to the inverting input terminal TA of the fourth comparator CM4. A non-inverting input terminal TB of the fourth comparator CM4 is connected to the second relay switch SMR side in the second switching part 22, i.e., connected to a main terminal of the fifth switch SW5, where the fifth switch SW5 and the sixth switch SW6 are connected in series. The battery voltage VB is supplied to the non-inverting input terminal TB of the fourth comparator CM4.

The fourth comparator CM4 transmits the in-system switching signal SG to the fifth switch SW5 and the sixth switch SW6 through the output terminal TC of the fourth comparator CM4 in response to the voltage difference ΔV between the load voltage VD and the battery voltage VB being less than a predetermined threshold voltage VX. When receiving the in-system switching signal SG, the fifth switch SW5 and the sixth switch SW6 are switched to the open state from the closed state. The fourth comparator CM4 transmits the in-system switching signal SG to the first switch SW1 and the second switch SW2 through the output terminal TC of the fourth comparator CM4 in response to the voltage difference ΔV being greater than the predetermined threshold voltage VX. When receiving the in-system switching signal SG, the first switch SW1 and the second switch SW2 are switched to the closed state from the open state.

The output terminal TC of the fourth comparator CM4 is connected to a wiring through which the controller 40 is connected to the gate of the fifth switch SW5, and further connected to a wiring through which the controller 40 is connected to the gate of the sixth switch SW6. This structure makes it possible for the in-system switching part 27 to switch the fifth switch SW5 and the sixth switch SW6 between the closed state and the open state, independently from the control of the controller 40. In the present embodiment, the fourth comparator CM4 corresponds to the signal output circuit, and the fifth switch SW5 and the sixth switch SW6 correspond to the in-system switch, and the gate of each of the fifth switch SW5 and the sixth switch SW6 corresponds to the open/close control terminal. The predetermined threshold voltage VX corresponds to the predetermined threshold voltage, and the total value of the battery voltage VB and the predetermined threshold voltage VX corresponds to the predetermined upper limit value.

This structure makes it possible to switch the fifth switch SW5 and the sixth switch SW6 to the closed state and to start the charging of the second battery 16 when the voltage difference ΔV becomes greater than the predetermined threshold voltage VX and overvoltage occurs in any one of the first system ES1 and the second system ES2 under the situation in which the first switch SW1 and the second switch SW2 have been switched to the closed state, and the fifth switch SW5 and the sixth switch SW6 have been switched to the open state. As a result, this structure makes it possible to start the charging of the second battery 16 before the controller 40 switches the first switch SW1 and the second switch SW2 to the closed state from the open state, and switches the fifth switch SW5 and the sixth switch SW6 to the closed state from the open state.

The present embodiment previously described in detail has the following effects.

The present embodiment provides the structure in which the in-system switching part 27 is arranged in addition to the controller 40. The in-system switching part 27 switches the fifth switch SW5 and the sixth switch SW6 between the closed state and the open state, independently from the control of the controller 40. When overvoltage occurs during the open control period of the controller 40 during which the fifth switch SW5 and the sixth switch SW6 are maintained in the open state, the in-system switching part 27 switches the fifth switch SW5 and the sixth switch SW6 to the closed state during the open control period before the controller 40 switches the first switch SW1 and the second switch SW2 to the open state. This makes it possible for the second battery 16 to receive the overvoltage, and to correctly drive the first load 34 and the second load 36 during the occurrence of overvoltage.

In the present embodiment, the fourth comparator CM4 is arranged as the in-system switching part 27. This fourth comparator CM4 transmits the switching signal to the fifth switch SW5 and the sixth switch SW6 in response to the voltage difference ΔV being less than the predetermined threshold voltage VX. The fifth switch SW5 and the sixth switch SW6 are switched to the open state based on the received switching signal. Further, the fourth comparator CM4 transmits the fifth switch SW5 and the sixth switch SW6 in response to the voltage difference ΔV being greater than the predetermined threshold voltage VX. The fifth switch SW5 and the sixth switch SW6 are switched to the closed state based on the received switching signal.

Accordingly, the fourth comparator CM4 switches the fifth switch SW5 and the sixth switch SW6 to the closed state, and the second battery 16 receives overvoltage through the fifth switch SW5 and the sixth switch SW6 when overvoltage occurs in any one of the first system ES1 and the second system ES2, and the voltage difference ΔV becomes greater than the predetermined threshold voltage VX. Further, because the fourth comparator CM4 is a hardware element, it is possible for the second battery 16 to quickly receive overvoltage when the voltage difference ΔV becomes greater than the predetermined threshold voltage VX.

The structure of the present embodiment detects the increasing of the battery voltage VB based on the voltage difference ΔV between the load voltage VD and the battery voltage VB. This makes it possible to correctly detect the increasing of the battery voltage VB based on the reference voltage, i.e., the battery voltage VB.

Fourth Embodiment

Figure 8:
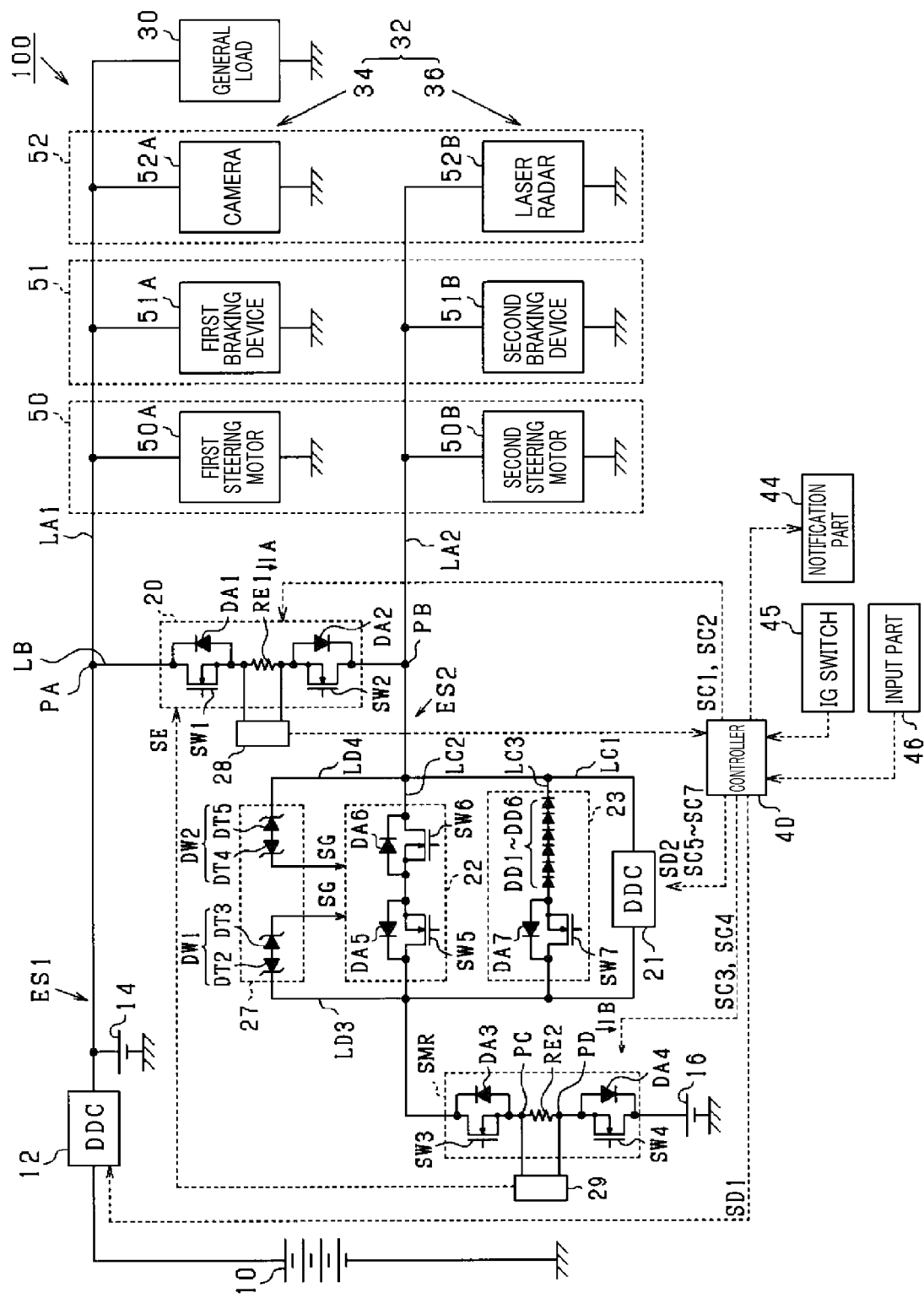
FIG. 8 is view showing an overall structure of the power source system according to a fourth embodiment.

Hereinafter, a description will now be given of the fourth embodiment. The following description explains a difference between the fourth embodiment and the third embodiment with reference to FIG. 8.

The present embodiment provides a structure in which the in-system switching part 27 is composed of a first bi-directional Zener diode DW1 and a second bi-directional Zener diode DW2, which is different in structure from the third embodiment.

In the present embodiment, a third wiring LD3 is arranged, at the relay switch SMR side in the second switching part 22, between a gate of the fifth switch SW5 and a main terminal of the fifth switch SW5, where the fifth switch SW5 and the sixth switch SW6 in a pair are connected in series. The first bi-directional Zener diode DW1 is arranged on the third wiring LD3. One terminal of the first bi-directional Zener diode DW1 is connected to one terminal of the fifth switch SW5, and the other terminal of the first bi-directional Zener diode DW1 is connected to the gate of the fifth switch SW5. The fifth switch SW5 is switched between the open state and the closed state based on the fifth switching signal SC5 transmitted from the controller 40 and the in-system switching signal SG transmitted from the first bi-directional Zener diode DW1.

The first bi-directional Zener diode DW1 is composed of a second Zener diode DT2 and a third Zener diode DT3. The second Zener diode DT2 and the third Zener diode DT3 are arranged in series and a forward direction thereof is opposite to each other. In more detail, the second Zener diode DT2 is arranged closer to the relay switch SMR side than the third Zener diode DT3 is. An anode of the second Zener diode DT2 is arranged at the gate side, and a cathode of the second Zener diode DT2 is arranged at the relay switch SMR side. An anode of the third Zener diode DT3 is arranged at the relay switch SMR side, and a cathode of the third Zenner diode DT3 is arranged at the gate side.

In the present embodiment, a fourth wiring LD4 is arranged at the connection node PB side of the second switching part 22, that is, between a gate and a main terminal of the sixth switch SW6, where the fifth switch SW5 and the sixth switch SW6 as a pair are connected in series. The second bi-directional Zener diode DW2 is arranged on the fourth wiring LD4. That is, one terminal of the second bi-directional Zener diode DW2 is connected to one of the main terminals of the sixth switch SW6, and the other terminal of the second bi-directional Zener diode DW2 is connected to the gate of the sixth switch SW6. This structure makes it possible to switch the sixth switch SW6 between the open state and the closed state based on the received sixth switching signal SC6 and the in-system switching signal SG transmitted through the second bi-directional Zener diode DW2.

The second bi-directional Zener diode DW2 is composed of a fourth Zener diode DT4 and a fifth Zener diode DT5. The fourth Zener diode DT4 and the fifth Zener diode DT5 are arranged in series and a forward direction thereof is opposite to each other. In more detail, the fourth Zener diode DT4 is arranged closer to the gate side than the fifth Zener diode DT5 is. An anode of the fourth Zener diode DT4 is arranged at the connection node PB side, and a cathode of the fourth Zener diode DT4 is arranged at the gate side. Further, an anode of the fifth Zener diode DT5 is arranged at the gate side, and a cathode thereof is arranged at the connection node PB side.

The second to fifth Zener diodes DT2 to DT5 have the same breakdown voltage VZ. In the present embodiment, the first Zener diode DT1 is configured to have the breakdown voltage VZ greater than the voltage difference ΔV between the load voltage VD and the battery voltage VB when no overvoltage occurs in any one of the first system ES1 and the second system ES2. Accordingly, the second Zener diode DT2 prohibits the gate of the sixth switch SW6 from receiving the load voltage VD by the rectifier function of the fifth Zener diode DT5 in response to the voltage difference ΔV being less than the breakdown voltage VZ. The second Zener diode DW2 transmits, to the gate of the sixth switch SW6, the in-system switching signal SG having a voltage capable of switching the sixth switch SW6 to the open state from the closed state. The first bi-directional Zener diode DW1 prohibits the gate of the fifth switch SW5 from receiving the battery voltage VB by the rectifier function of the second Zener diode DT2. The first bi-directional Zener diode DW1 transmits, to the gate of the fifth switch SW5, the in-system switching signal SG having a voltage capable of switching the fifth switch SW5 to the open state from the closed state.

On the other hand, when the voltage difference ΔV becomes greater than the breakdown voltage VZ, the fifth Zener diode DT5 has no rectifier function, and the load voltage VD is supplied to the gate of the sixth switch SW6. That is, the gate of the sixth switch SW6 receives the in-system switching signal SG having the voltage capable of switching the sixth switch SW6 to the closed state from the open state. Thereby, when the sixth switch SW6 is switched to the open state from the closed state, this starts the charging of the second battery 16 through the sixth switch SW6 and the fifth parasitic diode DA5. In the present embodiment, the first bi-directional Zener diode DW1 and the second bi-directional Zener diode DW2 correspond to the signal output circuit, and the breakdown voltage VZ corresponds to the predetermined threshold voltage.

That is, the structure of the present embodiment starts the charging of the second battery 16 when the voltage difference ΔV becomes greater than the breakdown voltage VZ and overvoltage occurs in any one of the first system ES1 and the second system ES2 under the situation in which the first switch SW1 and the second switch SW2 are in the closed state, and the fifth switch SW5 and the sixth switch SW6 are in the open state. As a result, this structure makes it possible to start the charging of the second battery 16 before the controller 40 switches the first switch SW1 and the second switch SW2 to the closed state from the open state and before the controller 40 switches the fifth switch SW5 and the sixth switch SW6 to the closed state from the open state.

According to the present embodiment previously described in detail, the first bi-directional Zener diode DW1 and the second bi-directional Zener diode DW2 are arranged as the in-system switching part 27. In response to the voltage difference ΔV between the load voltage VD and the battery voltage VB being less than the predetermined breakdown voltage VZ, the first bi-directional Zener diode DW1 and the second bi-directional Zener diode DW2 transmit the switching signals to the fifth switch SW5 and the sixth switch SW6 to switch those switches to the open state. Further, in response to the voltage difference ΔV being greater than the predetermined breakdown voltage VZ, the second bi-directional Zener diode DW2 transmits the switching signal to the sixth switch SW6 so as to switch the sixth switch SW6 to the closed state.

When overvoltage occurs in any one of the first system ES1 and the second system ES2, and the voltage difference ΔV becomes greater than the predetermined breakdown voltage VZ, the sixth switch SW6 is switched to the closed state, and the second battery 16 receives overvoltage through the sixth switch SW6 and the fifth parasitic diode DA5. Further, because the first bi-directional Zener diode DW1 and the second bi-directional Zener diode DW2 are composed of hardware elements, it is possible for the second battery 16 to quickly receive overvoltage when the voltage difference ΔV between the load voltage VD and the battery voltage VB becomes greater than the predetermined threshold voltage VX.

Other Embodiments

The concept of the present disclosure is not limited by the embodiments previously described. It is possible for the present disclosure to have the following structures.

For example, it is possible to use following devices as the loads 34 and 36.

It is acceptable for the embodiment to use, as the loads, a drive motor and a drive circuit that provide the driving power to a vehicle, where the drive circuit controls the drive motor. For example, the first load 34 and the second load 36 correspond to a three-phase synchronous motor, and a three-phase inverter, respectively.

It is acceptable for the embodiment to use, as the load, an anti-lock braking device to prevent vehicle wheels from locking during braking. In this case, the first load 34 and the second load 36 correspond to an ABS actuator as a hydraulic device adjusting the brake oil pressure during braking.

It is acceptable to use a cruise control device for detecting a vehicle ahead, as the load, and for maintaining a distance between my vehicle and the vehicle ahead, and for driving my vehicle at a predetermined speed when not detecting the vehicle ahead. In this case, each of the first load 34 and the second load 36 corresponds to millimeter wave radars.

It is not necessary to use a combination of the first load 34 and the second load 36 having the same structure. It is acceptable to have a combination of the first load 34 and the second load 36 having a different structure and providing the same function. It is acceptable for the first load 34 and the second load 36 to be composed of the same load. That is, it is acceptable for the first load 34 and the second load 36 to have a structure configured to receive electric power from both the first power supply path LA1 and the second power supply path LA2.

It is acceptable to use an alternator as the first power source instead of using the converter.

The embodiments previously described show the exemplary embodiment in which the second converter 21 boosts the power source voltage VB, and the second battery 16 is charged by using the boosted voltage of the power source voltage VA when the second battery 16 is charged by the power source voltage VA of the first comparator 12. However, the concept of the present disclosure is not limited by this. For example, it is acceptable to charge the second battery 16 by the following cases.

Figure 9:
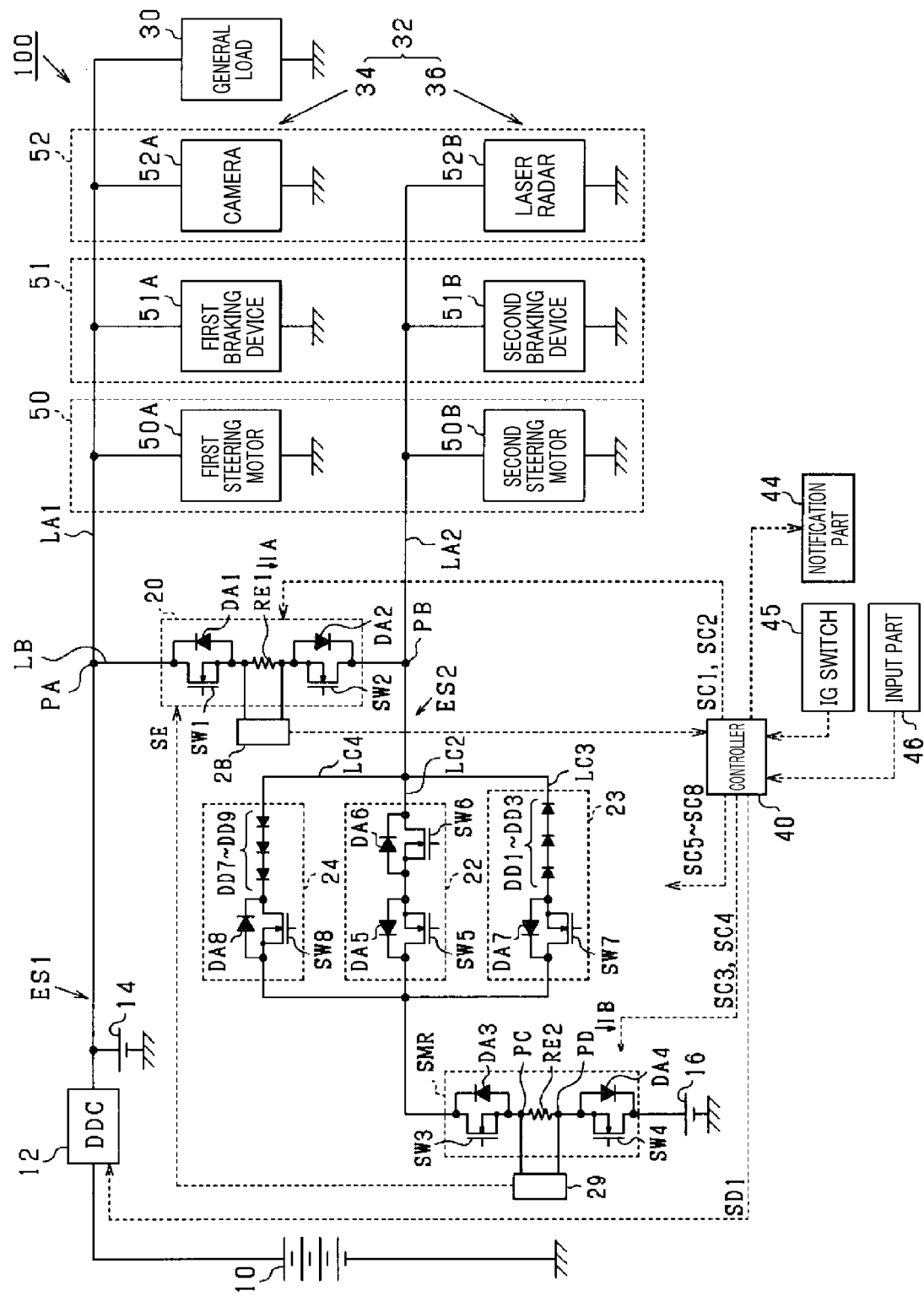
FIG. 9 is view showing an overall structure of the power source system according to another embodiment.

It is acceptable to charge the second battery 16 without using a boosted voltage and a voltage drop of the power source voltage VA. In this case, as shown in FIG. 9, it is possible to eliminate the second comparator 21 from the power source system, and the battery voltage VB becomes equivalent to the power source voltage VA when it is detected that no overvoltage occurs in any one of the first system ES1 and the second system ES2.

It is acceptable to charge the second battery 16 by using the voltage drop of the power source voltage VA. In this case, the battery voltage VB becomes less than the power source voltage VA when it is detected that no overvoltage occurs in any one of the first system ES1 and the second system ES2.

Figure 10:
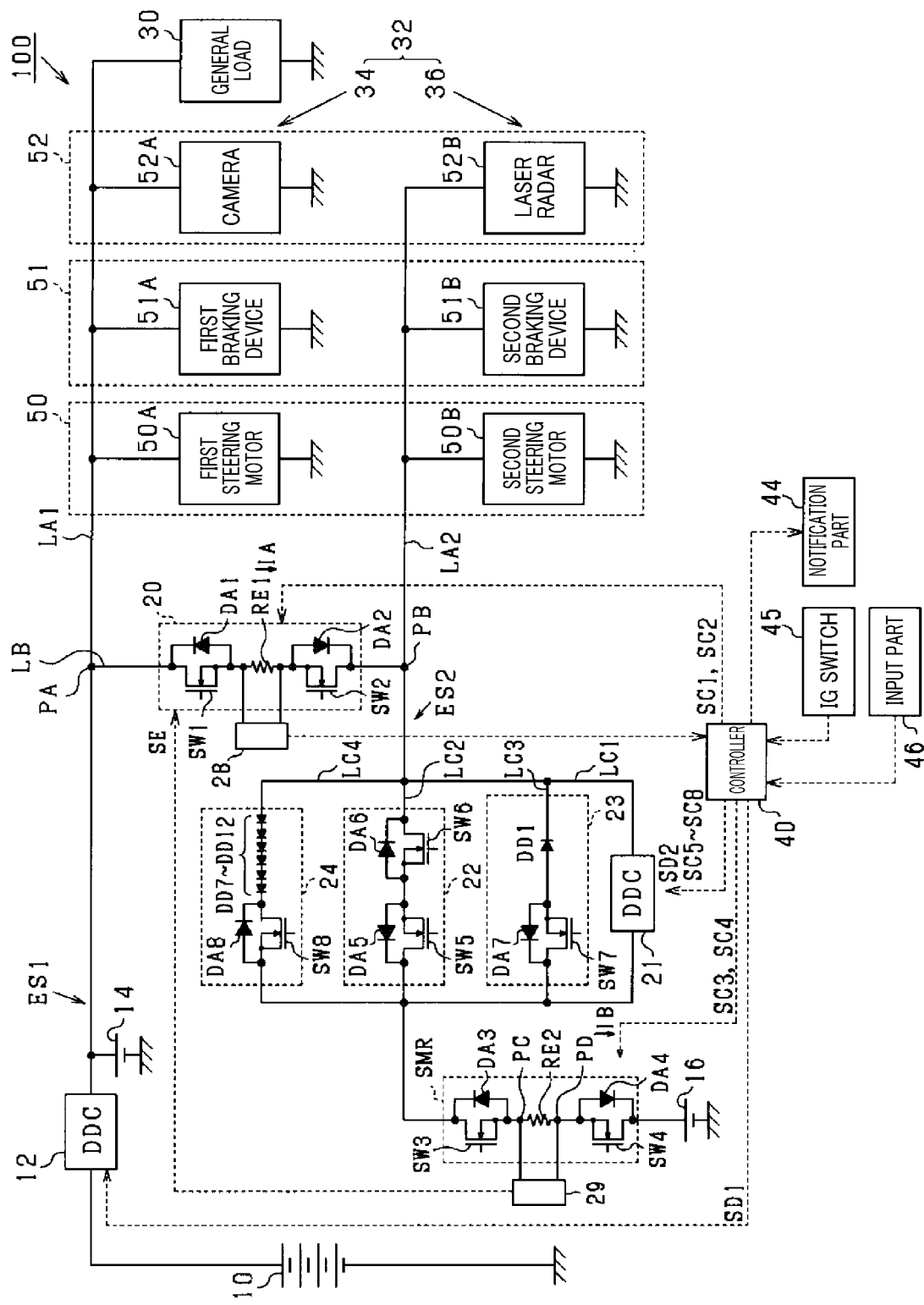
FIG. 10 is view showing an overall structure of the power source system according to another embodiment.

FIG. 10 shows the power source system 100 for charging the second battery 16 by using the voltage drop of the power source voltage VA. As shown in FIG. 1, FIG. 9 and FIG. 10, the battery voltage VB is reduced in order, and the total number of the diodes DD1 to DD6, other than the seventh parasitic diode DD7, is reduced in order. Further, the total number of the diodes DD7 to DD12 in the connection part 24, other than the eighth parasitic diode DA8, increases due to the voltage drop of the battery voltage VB.

Figure 11:
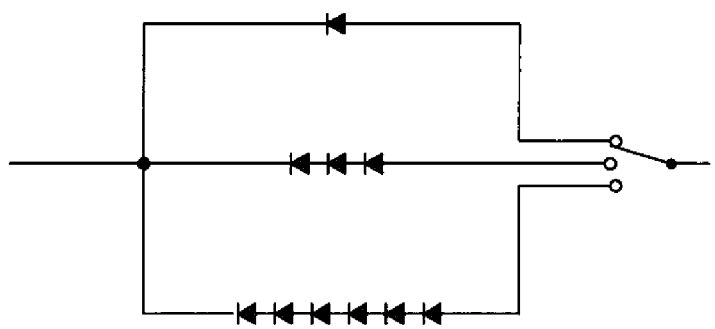
FIG. 11 is view showing a structure of switching diodes.

As shown in FIG. 11, it is possible to commonly use the power source system 100 having a mechanism where the total number of diodes connected in series is changeable in response to the change of the battery voltage VB.

In the embodiments previously described, it is not necessary to arrange the discharging part 23 in the power source system 100. It is acceptable to form the second switching part 22 by a plurality of diodes connected in series when no discharging part 23 is arranged.

Figure 12:
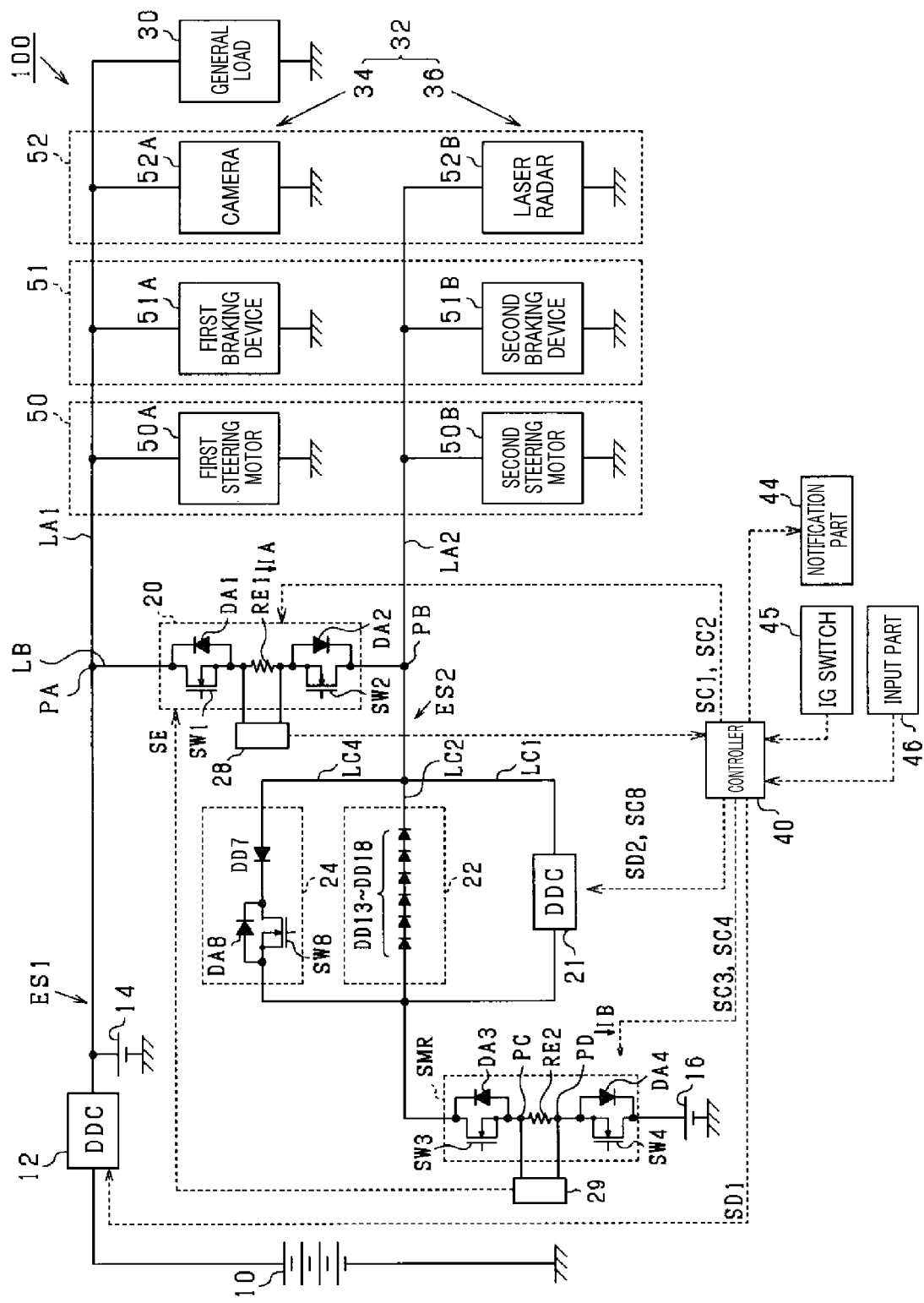
FIG. 12 is view showing an overall structure of the power source system according to another embodiment.

FIG. 12 shows an exemplary structure of the first embodiment in which the second switching part 22 is composed of thirteenth to eighteenth diodes DD13 to DD18 connected in series. A cathode of each of the thirteenth to eighteenth diodes DD13 to DD18 is connected to the connection path LB side, and an anode thereof is connected to the relay switch SMR side. This structure prohibits the second battery 16 from supplying electric power to the connection node PB in the discharging path LC2.

Specifically, each of the thirteenth to eighteenth diodes DD13 to DD18 has a predetermined voltage drop amount in the forward direction. This generates the reference voltage difference ΔVK based on the total value of the predetermined voltage drop amounts in the forward direction of the thirteenth to eighteenth diodes DD13 to DD18, between the battery voltage VB and the load voltage VD, where the voltage VB is supplied to the relay switch SMR side in the second switching part 22, and the load voltage VD is supplied to the connection node PB side in the second switching part 22 under a situation in which the third switch SW3 and the fourth switch SW4 in the relay switch SMR are switched to the closed state. Hereinafter, the reference voltage difference ΔVK of the seventh diode DD7 will be described as the first reference voltage difference ΔVK1, and the reference voltage difference ΔVK of the thirteenth to eighteenth diodes DD13 to DD18 will be described as the second reference voltage difference ΔVK2.

The thirteenth to eighteenth diodes DD13 to DD18 allow the second battery 16 to supply electric power to the connection node PB in response to the load voltage VD being less than the battery voltage VB by more than the second reference voltage difference ΔVK2. The thirteenth to eighteenth diodes DD13 to DD18 prohibit the second battery 16 from supplying electric power to the connection node PB in response to the load voltage VD being not less than the battery voltage VB by more than the second reference voltage difference ΔVK2. The control previously described is also applied to the structure of the second embodiment.

In the fourth embodiment previously described, it is not necessary to arrange the first bi-directional Zener diode DW1 in the power source system 100.

The first and second embodiments previously described show the exemplary structure in which the element is arranged on the connection part 24, and the element prohibits the connection node PB from supplying electric power to the second battery 16 based on the voltage difference ΔV between the load voltage VD and the battery voltage VB. However, the concept of the present disclosure is not limited by this. For example, it is acceptable to arrange an element on the connection part 24, and the element prohibits the connection node PB from supplying electric power to the second battery 16 based on the voltage difference between the load voltage VD and the ground voltage GND, i.e., based on the load voltage VD.

The third and fourth embodiments previously described show the exemplary structure in which the element is arranged in the in-system switching part 27, the element transmits the signal to the fifth switch SW5 and the sixth switch SW6 so as to switch them to the open state based on the voltage difference ΔV between the load voltage VD and the battery voltage VB. However, the concept of the present disclosure is not limited by this. For example, it is acceptable to arrange an element in the in-system switching part 27, where the element transmits the signal to the fifth switch SW5 and the sixth switch SW6 so as to switch them to the open state based on the voltage difference between the load voltage VD and the ground voltage GND, i.e., based on the load voltage VD.

The embodiments previously described show the exemplary structure in which the power source system 100 is applied to manual transmission vehicles and self-driving vehicles. However, the concept of the present disclosure is not limited by this. For example, it is acceptable to apply the power source system to self-driving vehicles only. It is also acceptable to apply the power source system to manual transmission vehicles only.

For example, when abnormality occurs in one of the first system ES1 and the second system ES2 of a self-driving vehicle to which the power source system of the present disclosure has been applied, it is acceptable for the power source system to automatically stop the vehicle running, or to stop the vehicle running after the vehicle is moved to a safety place by using the loads 34, 36 arranged in the other system without abnormality occurrence.

While specific embodiments of the present disclosure have been described in detail, the concept of the present disclosure is not limited by the embodiments and the modifications previously described. It will be appreciated by those skilled in the art that various modifications and alternatives to those details could be developed in light of the overall teachings of the disclosure. Accordingly, the particular arrangements disclosed are meant to be illustrative only and not limited to the scope of the present disclosure which is to be given the full breadth of the following claims and all equivalents thereof.

What is claimed is:

1. A power source system comprising:
   a first system supplying electric power of a first power source to an electric load through a first power supply path;
   a second system supplying electric power of a second power source to the electric load through a second power supply path;
   an intersystem switch arranged on a connection path through which the first power supply path and the second power supply path are connected, the first power source supplying a power source voltage to drive the electric load, and the second power source comprising a battery to be charged by the power source voltage of the first power source;
   a switching controller switching the intersystem switch between an open state and a closed state; and
   a charging discharging part, arranged between the second power source and a connection node between the second power supply path and the connection path, supplying the power source voltage to the battery to be charged, and performing discharging of the battery after completion of charging of the battery in response to a discharging request, wherein the charging discharging part starts to charge the battery before the switching controller switches the intersystem switch to the open state from the closed state when overvoltage occurs in any one of the first system and the second system under the closed state of the intersystem switch, and the charging discharging part comprises:

a prohibition part prohibiting the battery from charging and discharging under the closed state of the intersystem switch after completion of charging of the battery; and a connection part connecting the connection node and the second power source during a prohibition period of the prohibition part in which the prohibition part prohibits the battery from charging and discharging before the switching controller switches the intersystem switch to the open state from the closed state when overvoltage occurs during the prohibition period.

2. The power source system according to claim 1, further comprising a first path and a second path arranged in parallel between the second power source and the connection node on the second power supply path at the connection path, wherein the prohibition part is arranged on the first path, and the connection part is arranged on the second path.

3. The power source system according to claim 2, wherein the connection part comprises a power supply control circuit prohibiting the connection node from supplying electric power to the battery in response to a voltage at the connection node being less than a predetermined upper limit value of the voltage at the connection node, and allowing the connection node to supply electric power to the battery in response to the voltage at the connection node being greater than the predetermined upper limit value.

4. The power source system according to claim 3, wherein the power supply control circuit prohibits the connection node from supplying electric power to the battery in response to a voltage difference between the voltage at the connection node being less than a predetermined threshold voltage, assuming that the voltage at the connection node being less than the predetermined upper limit value, and the power supply control circuit allows the connection node to supply electric power to the battery in response to the voltage difference between the voltage at the connection node being greater than the predetermined threshold voltage, detecting that the voltage at the connection node is greater than the predetermined upper limit value.

5. The power source system according to claim 4, wherein the power supply control circuit comprises a diode arranged in a direction to prohibit the battery from supplying electric power to the connection node on the second path.

6. The power source system according to claim 4, wherein the power supply control circuit comprises a Zener diode arranged in a direction to prohibit the connection node from supplying electric power to the battery in the second path.

7. A power source system comprising:

a first system supplying electric power of a first power source to an electric load through a first power supply path;

a second system supplying electric power of a second power source to the electric load through a second power supply path;

an intersystem switch arranged on a connection path through which the first power supply path and the second power supply path are connected, the first power source supplying a power source voltage to drive the electric load, and the second power source comprising a battery to be charged by the power source voltage of the first power source;

a switching controller switching the intersystem switch between an open state and a closed state; and a charging discharging part, arranged between the second power source and a connection node between the second power supply path and the connection path, supplying the power source voltage to the battery to be charged, and performing discharging of the battery after completion of charging of the battery in response to a discharging request, wherein the charging discharging part starts to charge the battery before the switching controller switches the intersystem switch to the open state from the closed state when overvoltage occurs in any one of the first system and the second system under the closed state of the intersystem switch, the charging discharging part comprises an in-system switch opening and closing the second power supply path, the switching controller switches the in-system switch between the closed state and the open state, and switches the in-system switch to the open state from the closed state after completion of charging of the battery, the charging discharging part further comprises an in-system switching part switching the in-system switch between a closed state and an open state, the in-system switching part being arranged and performing independently from the control of the switching controller, and the in-system switching part switches the in-system switch to the closed state from the open state during an open control period of the in-system switch and before the in-system switch is switched to the open state from the closed state when overvoltage occurs during the open control period.

8. The power source system according to claim 7, wherein the in-system switching part comprises a signal output circuit transmitting a switching signal to the in-system switch, the switching signal switching the in-system switch to the open state from the closed state in response to the voltage at the connection node being less than the predetermined upper limit voltage of the connection node, and the signal output circuit transmitting a switching signal to the in-system switch, to switch the in-system switch from the open state to the closed state in response to the voltage at the connection node being greater than the predetermined upper limit voltage of the connection node.

9. The power source system according to claim 8, wherein the signal output circuit transmits the switching signal to the in-system switch, to switch the in-system switch to the open state from the closed state in response to the voltage difference between the voltage at the connection node and the voltage of the battery being less than a predetermined threshold voltage, assuming that the voltage at the connection node is less than the predetermined upper limit value, and the signal output circuit transmits the switching signal to the in-system switch, to switch the in-system switch to the closed state from the open state in response to the voltage difference between the connection node and the battery being greater than the predetermined threshold voltage, assuming that the voltage at the connection node is greater than the predetermined upper limit value.

10. The power source system according to claim 9, wherein the signal output circuit comprises a comparator having input terminals as a pair, one of the input terminals of the comparator is connected to one of input terminals as a pair in the in-system switch, the other input terminal of the comparator is connected to the other input terminal of the in-system switch, and an output terminal of the comparator is connected to an open/close control terminal of the in-system switch.

11. The power source system according to claim 9, wherein the signal output circuit comprises two bi-directional Zener diodes arranged in series and a forward direction thereof being opposite to each other, one terminal of the bi-directional Zener diodes is connected to one of input terminals as a pair in the in-system switch, and the other terminal of the bi-directional Zener diodes is connected to the open/close control terminal of the in-system switch.

12. A power source system comprising:

a first system supplying electric power of a first power source to an electric load through a first power supply path;

a second system supplying electric power of a second power source to the electric load through a second power supply path;

an intersystem switch arranged on a connection path through which the first power supply path and the second power supply path are connected, the first power source supplying a power source voltage to drive the electric load, and the second power source comprising a battery to be charged by the power source voltage of the first power source;

a switching controller switching the intersystem switch between an open state and a closed state; and a charging discharging part, arranged between the second power source and a connection node between the second power supply path and the connection path, supplying the power source voltage to the battery to be charged, and performing discharging of the battery after completion of charging of the battery in response to a discharging request, wherein the charging discharging part starts to charge the battery before the switching controller switches the intersystem switch to the open state from the closed state when overvoltage occurs in any one of the first system and the second system under the closed state of the intersystem switch, and the power source system further comprises an intersystem switching part switching the intersystem switch between the closed state and open state, independently from the control of the switching controller, and the intersystem switching part switches the intersystem switch to the open state from the closed state before the switching controller switches the intersystem switch to the open state from the closed state when a current flows between the connection node and the second power source, which is greater than a predetermined threshold current, on starting the charging of the battery after the occurrence of the overvoltage.

13. The power source system according to claim 12, wherein the switching controller disconnects the connection node from the second power source in response to the voltage of the connection node being greater than a predetermined reference voltage even when the intersystem switching part switches the intersystem switch to the open state from the closed state.

\* \* \* \* \*